US012647536B2

(12) United States Patent　　　　(10) Patent No.:　US 12,647,536 B2
Bakke　　　　　　　　　　　　　　(45) **Date of Patent:　　*Jun. 2, 2026**

(54) DOOR PEEPHOLE VIEWER WITH DUAL CAMERA MODULES AND WIRELESS CONNECTIVITY

(71) Applicant: Erik Bakke, Seattle, WA (US)

(72) Inventor: Erik Bakke, Seattle, WA (US)

( * ) Notice:　Subject to any disclaimer, the term of this patent is extended or adjusted under 35 U.S.C. 154(b) by 0 days.

This patent is subject to a terminal disclaimer.

(21) Appl. No.: 18/671,913

(22) Filed:　May 22, 2024

(65)　　　　Prior Publication Data

US 2025/0365392 A1　　Nov. 27, 2025

(51) Int. Cl.
| | |
|---|---|
| *H04N 7/18* | (2006.01) |
| *G01J 5/00* | (2022.01) |
| *H04N 5/76* | (2006.01) |
| *H04N 23/51* | (2023.01) |
| *H04N 23/57* | (2023.01) |
| *H04N 23/58* | (2023.01) |
| *H04N 23/60* | (2023.01) |
| *H04N 23/65* | (2023.01) |
| *H04N 23/90* | (2023.01) |

(52) U.S. Cl.
CPC ........... *H04N 7/181* (2013.01); *G01J 5/0025* (2013.01); *H04N 5/76* (2013.01); *H04N 23/51* (2023.01); *H04N 23/57* (2023.01); *H04N*

*23/58* (2023.01); *H04N 23/64* (2023.01); *H04N 23/651* (2023.01); *H04N 23/90* (2023.01)

(58) Field of Classification Search
None
See application file for complete search history.

(56)　　　　References Cited

U.S. PATENT DOCUMENTS

| | | | | |
|---|---|---|---|---|
| 12,129,707 B2 * | 10/2024 | Bakke | .................... | H04N 7/186 |
| 2016/0018560 A1 * | 1/2016 | Shimizu | ................... | G01V 8/10 |
| | | | | 73/488 |
| 2019/0364244 A1 * | 11/2019 | Siminoff | .......... | G08B 13/19682 |
| 2020/0208436 A1 * | 7/2020 | Colligan | ................. | G08B 5/36 |
| 2022/0053142 A1 * | 2/2022 | Manzari | ................ | H04N 23/69 |
| 2022/0417430 A1 * | 12/2022 | Besley | ................ | G02B 7/1821 |

* cited by examiner

*Primary Examiner* — Eileen M Adams

(57)　　　　ABSTRACT

Assemblies, sensors, methods of attachment, communication networks, and operational processes of a door-mounted camera apparatus with two integrated camera modules, for use with a door's peephole viewer. Some embodiments include a door bracket for attaching the camera apparatus to the door using removable adhesive or embedded magnets. Embodiments may include a movable mirror assembly which may be operated by a hand or by electrically powered mechanical actuator. Some embodiments include a peephole viewer apparatus with integrated sensors. Embodiments can include a digital display for viewing the camera's video output. Some embodiments can include a wired or wireless external sensor module which may detect whether a person is present in front of the door.

6 Claims, 29 Drawing Sheets

4102          21          21

4104     4110     4106

4102     4112     4108

DOOR PEEPHOLE VIEWER WITH DUAL CAMERA MODULES AND WIRELESS CONNECTIVITY

CROSS-REFERENCE TO RELATED APPLICATIONS

This application claims the benefit of Provisional Patent Application Ser. No. 63/468,486, filed on May 23, 2023, which is entirely incorporated herein by reference.

This application's invention is related to the invention specified in U.S. patent application Ser. No. 17/551,181, filed on Dec. 15, 2021.

TECHNICAL FIELD

The present disclosure relates generally to the field of wireless camera systems for home monitoring. More particularly, the present disclosure relates to assemblies, sensors, methods of attachment, and operational processes of door mounted camera systems intended to be used in conjunction with a door's peephole viewer.

BACKGROUND

Many home entry doors include a peephole viewer mounted in the door, as described in U.S. Pat. No. 4,269, 474A to Yasushi Kamimura (1979). In the past decade, video doorbells became affordable and popular as an alternative to peephole viewers.

Video doorbells allow a homeowner or renter to monitor the area around the front entrance to the home. Such video doorbells are convenient for homeowners, but are not conducive to installation in most rental apartment units. Many home owners' associations (HOA) and landlords will not allow residents to install cameras outside of their homes. Such devices provides wireless remote monitoring, alerting the user when a person is present on the other side of the door.

Peephole door viewer camera devices are available from a number of companies. One example is the Ring Peephole Cam (https://ring.com/products/door-peephole-security-camera). Such devices require the user to remove or alter the current peephole viewer using tools, and to install a bulky module over the peephole on both sides of the door. Most of these devices include a camera module with a button, which is mounted on the outside-facing side of the door over the peephole, or next to the door. This makes it obvious to any passer-by that they are potentially being recorded. These devices usually use a low power PIR (passive infrared) sensor to turn the camera on only when activity is detected, in order to maximize battery life. PIR and other proximity sensors cannot operate through opaque materials or glass. Thus, these camera devices must have an enclosure with a camera and PIR sensor which is mounted over the peephole viewer on the outside-facing side of the door.

High resolution image sensors have high power requirements, making it infeasible to leave the camera on constantly. Recently, image sensors with low resolution and ultra-low power usage have become available commercially. The invention specified herein make use of this type of low resolution, ultra-low power sensor, in conjunction with a second high resolution image sensor to solve the power usage problem, while still offering high quality images and video when a person or activity is detected.

A number of issued patents cover similar types of methods and apparatus:

U.S. Ser. No. 11/501,618-B1
US-20170048495-A1
U.S. Pat. No. 9,912,920-B2
US-20140028866-A1

Although other door peephole viewer camera designs exist, some embodiments in the specification herein have the following advantages:

(a) The door peephole viewer camera does not require replacing the current peephole viewer.

(b) It is simpler to install, requiring no tools.

(c) It is easy to remove.

(d) The outside-facing side of the door remains unchanged.

(e) Any passer-by is not alerted to being video-monitored.

(f) The dual image sensor design allows for both low power and high resolution video (g) External motion sensors can be added to extend battery life.

(h) It is portable, for temporary use such as on a hotel room door.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION—FIGS. 1, 2, 3A, 3B, 3C, 3D, 3E, 4—EMBODIMENT A

Figure 1:
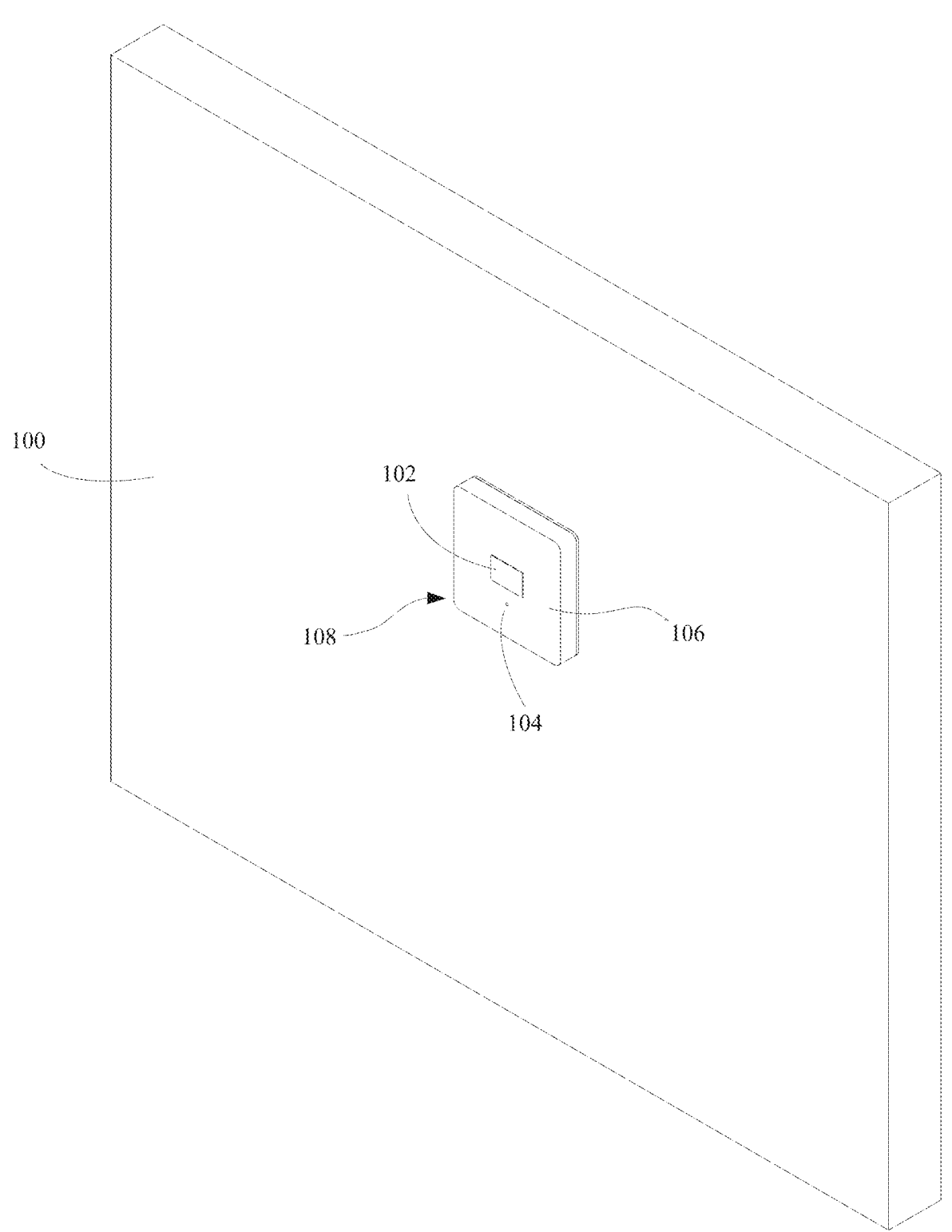
FIG. 1—Embodiment A—isometric view of peephole viewer camera apparatus installed on the door FIG. 2—Embodiment A—isometric view of removable camera apparatus assembly, door bracket assembly installed on the door FIG. 3A—Embodiment A—front view of peephole viewer camera apparatus FIG. 3B—Embodiment A—side cross-section view of peephole viewer camera apparatus installed on the door FIG. 3C—Embodiment A—side cross-section view of camera module FIG. 3D—Embodiment A—close-up side cross-section view of peephole viewer camera apparatus installed on the door in an example mirror configuration FIG. 3E—Embodiment A—close-up side cross-section view of peephole viewer camera apparatus installed on the door in another example mirror configuration FIG. 3F—Embodiment B1—close-up side cross-section view of peephole viewer camera apparatus installed on the door in an example mirror configuration FIG. 3G—Embodiment B1—close-up side cross-section view of peephole viewer camera apparatus installed on the door in another example mirror configuration FIG. 3H—Embodiment B2—close-up side cross-section view of peephole viewer camera apparatus installed on the door in an example mirror configuration FIG. 3J—Embodiment B2—close-up side cross-section view of peephole viewer camera apparatus installed on the door in another example mirror configuration FIG. 4 Embodiment A—exploded isometric view of peephole viewer camera apparatus FIG. 4A—Embodiment A—diagram of system components FIG. 4B—Embodiment A—operational flow chart FIG. 4C—Embodiment A1—exploded isometric view of door bracket assembly with support ring FIG. 4D—Embodiment A1—front view of door bracket assembly with support ring FIG. 4E—Embodiment A1—exploded isometric view of door bracket assembly with support ring with cutout FIG. 5—Embodiment C—isometric view of peephole viewer camera apparatus as it can be attached to a steel door FIG. 6—Embodiment C—exploded isometric view of peephole viewer camera apparatus FIG. 7—Embodiment C—side cross-section view of peephole viewer camera apparatus installed on the door FIG. 8—Embodiment J—side cross-section view of peephole viewer apparatus with integrated sensors FIG. 9—Embodiment J—side cross-section isolated view of sensor with FFC (flat flexible cable) only FIG. 10—Embodiment J—side cross-section exploded view of peephole viewer apparatus with integrated sensors FIG. 11—Embodiment J—isometric exploded view of peephole viewer apparatus with integrated sensors FIG. 12—Embodiment J—isometric isolated view of sensor with FFC (flat flexible cable) only FIG. 13—Embodiment J—front view of peephole viewer apparatus with integrated sensors FIG. 14—Embodiment J—opaque front view of peephole viewer apparatus with integrated sensors FIG. 15—Embodiment K—exploded view of welcome mat with integrated proximity sensors FIG. 16—Embodiment K—top view of welcome mat with integrated proximity sensors FIG. 17—Embodiment K—side view of welcome mat with integrated proximity sensors FIG. 18—Embodiment L—isometric view of wireless passive infrared proximity sensor module FIG. 19—Embodiment L—exploded isometric view of wireless passive infrared proximity sensor module FIG. 20—Embodiment L—top view of wireless passive infrared proximity sensor module FIG. 21—Embodiment L—side cross-section view of wireless passive infrared proximity sensor module FIG. 22—Embodiment M—isometric view of wireless proximity sensor module FIG. 23—Embodiment M—exploded isometric view of wireless proximity sensor module FIG. 24—Embodiment N—isometric view of wireless proximity sensor module with varied sensor angles FIG. 25—Embodiment N—exploded isometric view of wireless proximity sensor module with varied sensor angles FIG. 26—Embodiment N—top view of wireless proximity sensor module with varied sensor angles FIG. 27—Embodiment N—side cross-section view of wireless proximity sensor module with varied sensor angles FIG. 28—Embodiment P—isometric view of the door hanger sensor apparatus FIG. 29—Embodiment Q—isometric view of the door hanger sensor apparatus with key-holder magnet

FIG. 1 shows an overview of embodiment A in isometric view. Peephole viewer camera apparatus 108 is mounted on door 100. Display 102 is on the front face of camera apparatus front housing 106. Front proximity sensor 104 is also on the front face of housing 106.

Figure 2:
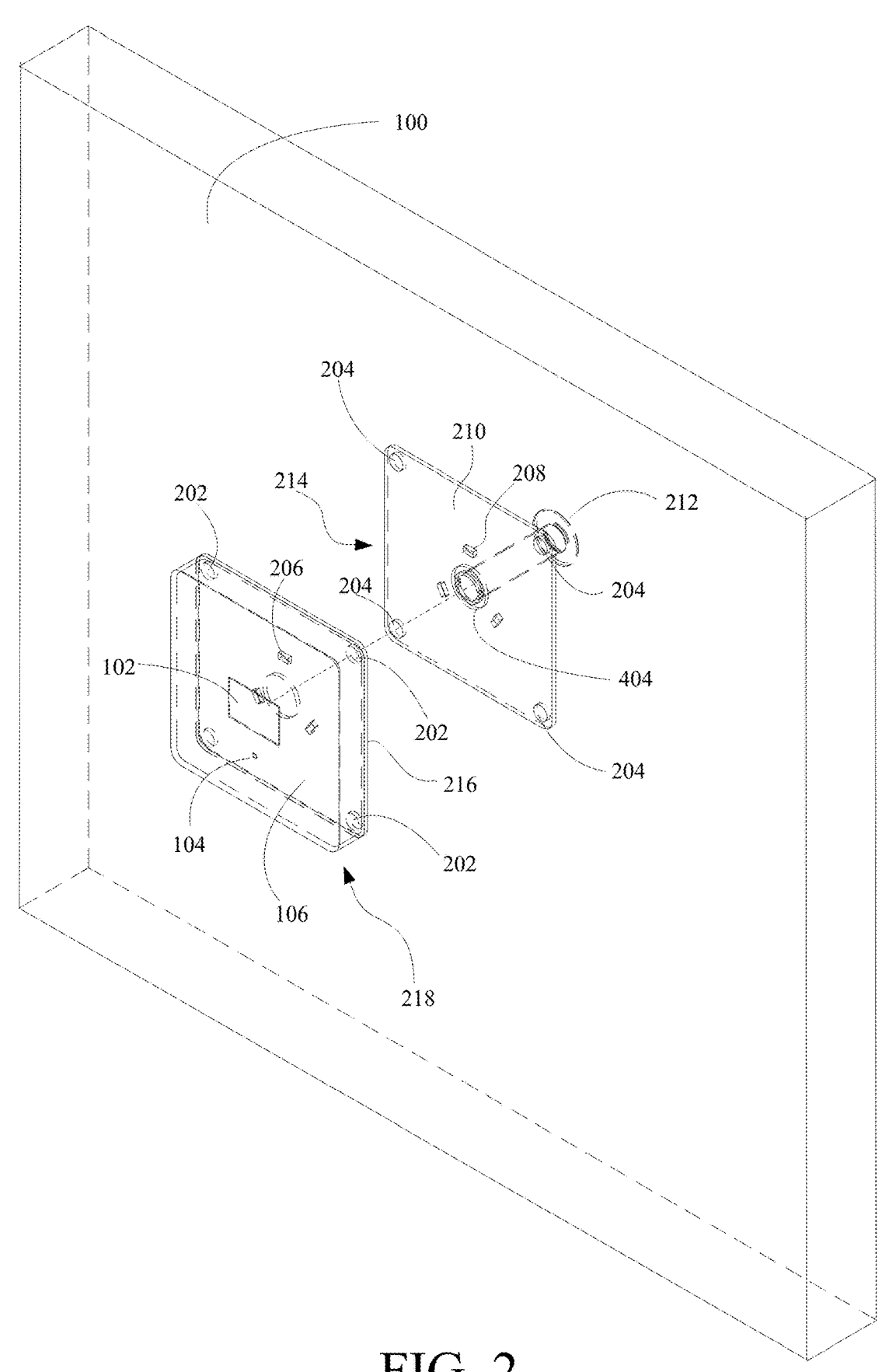

FIG. 2 shows an exploded isometric view of removable camera apparatus assembly 218 and door bracket assembly 214 installed on the door 100. The main structure of door bracket assembly 214 is door bracket 210, which is attached to door 100 by means of removable adhesive tape. The door bracket 210 has a door bracket viewing aperture 404, which is centered on door peephole viewer 212. A door bracket alignment magnet 204 is placed in each corner of the bracket 210. On the surface of bracket 210 is door bracket alignment feature 208. Alignment feature 208 may be a notch or ridge in a known configuration. FIG. 2 depicts the alignment feature 208 as three notches positioned radially in a symmetric pattern surrounding aperture 404.

FIG. 2 also shows removable camera apparatus assembly 218. It includes camera apparatus front housing 106, which is rigidly attached to housing lid 216. A housing alignment magnet 202 is placed in each corner of the lid 216 such that each matches the placement of magnet 204 on bracket 210. On the surface of lid 216 is housing alignment feature 206. Alignment feature 206 may be a notch or ridge in a known configuration. FIG. 2 depicts the alignment feature 206 as three notches or ridges positioned radially in a symmetric pattern such that the alignment feature 206 mates with alignment feature 208 when assembly 218 is pressed against assembly 214. Similarly, magnets 202 and magnets 204 will align and come into contact, pulling together assembly 218 and assembly 214 against door 100. Display 102 and front proximity sensor 104 are shown on the front face of housing 106.

Note that alignment features 206 and 208 are described as notches or ridges. However, these alignment features can represent any type of protrusion, cavity, or other type of feature, as long as feature 206 and 208 are able to mate. For instance, if feature 206 is a protrusion, then feature 208 must be a cavity, and vice versa.

Figure 3A:
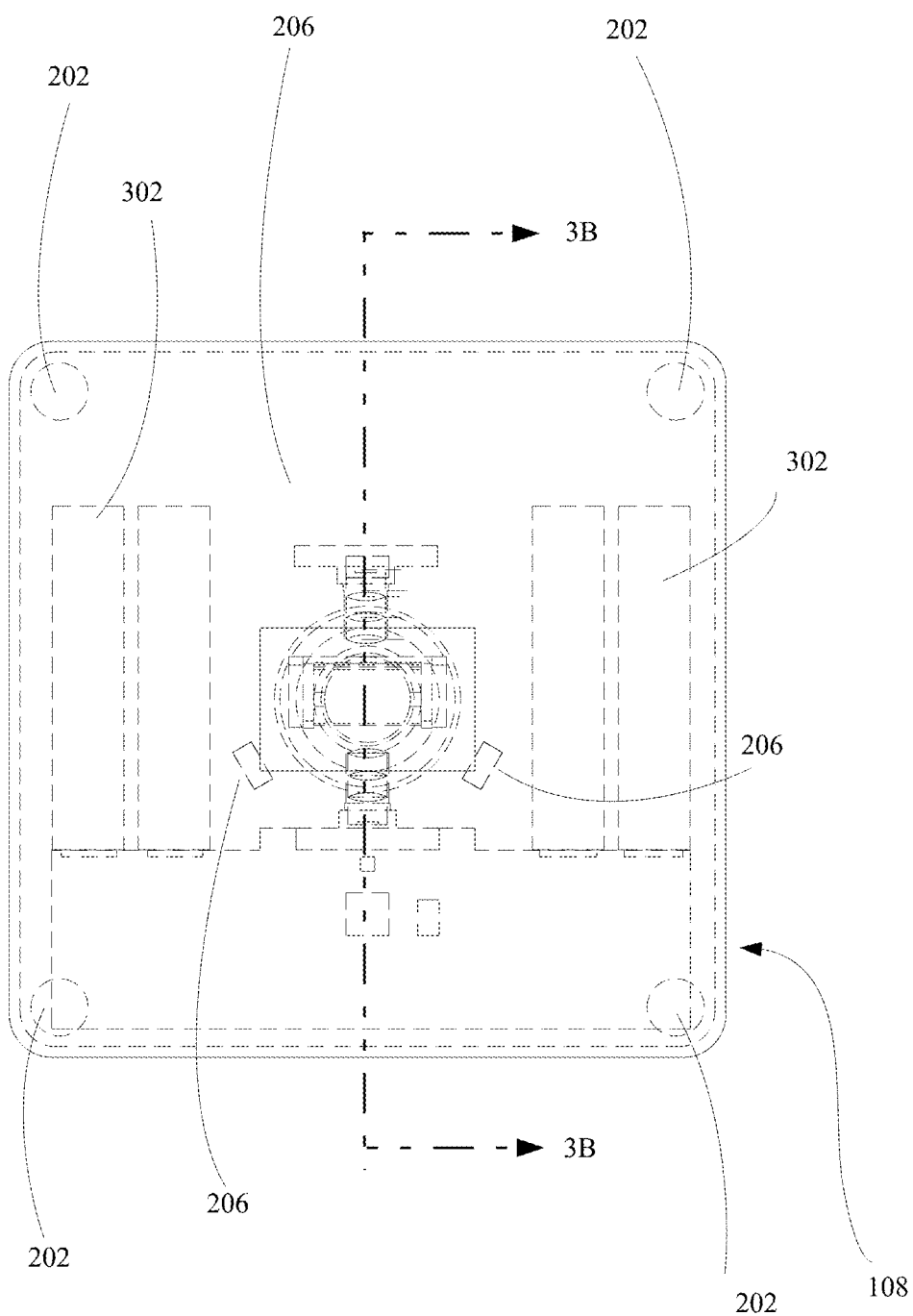

FIG. 3A shows a front view of peephole viewer camera apparatus 108. It shows placement of magnets 202, and alignment features 206.

Figure 3B:
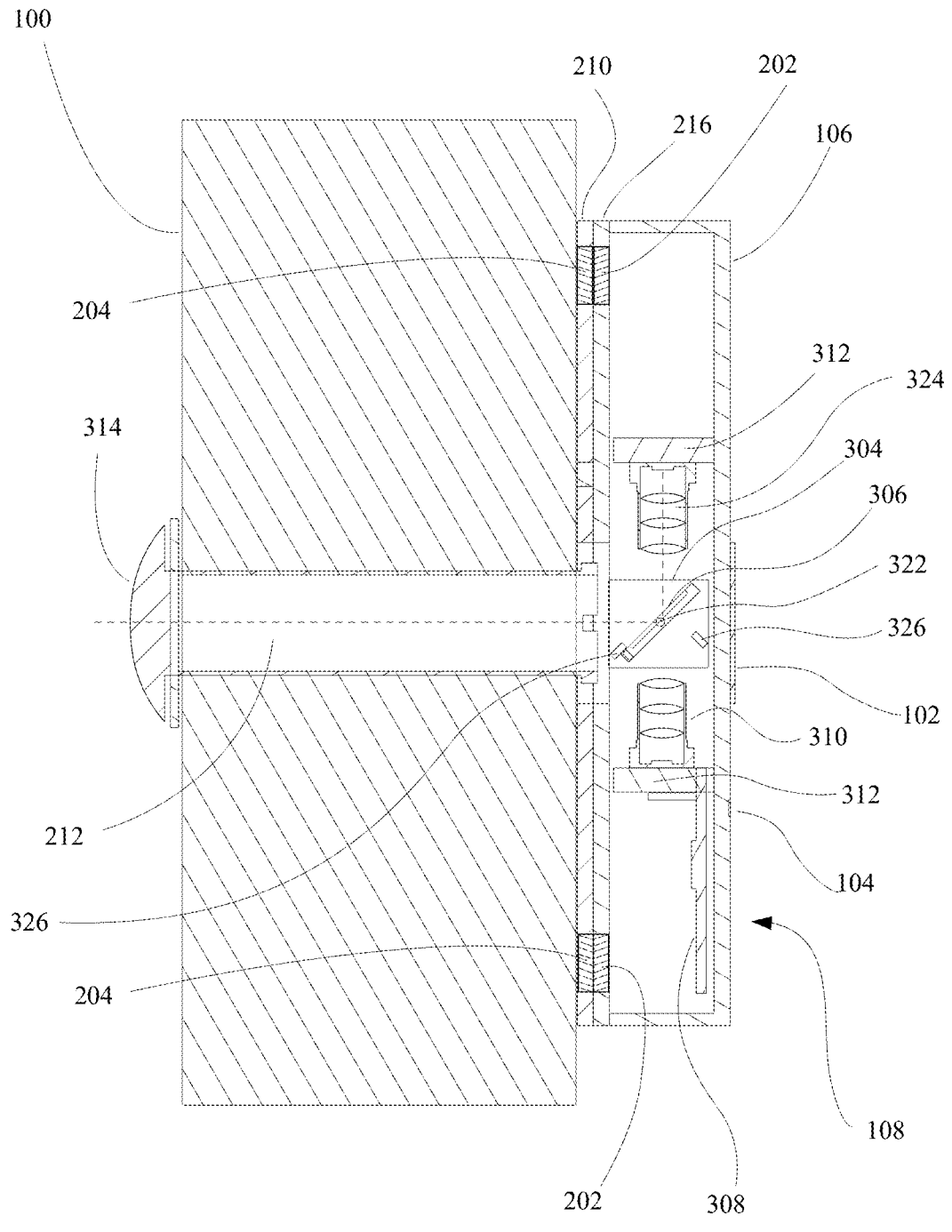
Figure 4:
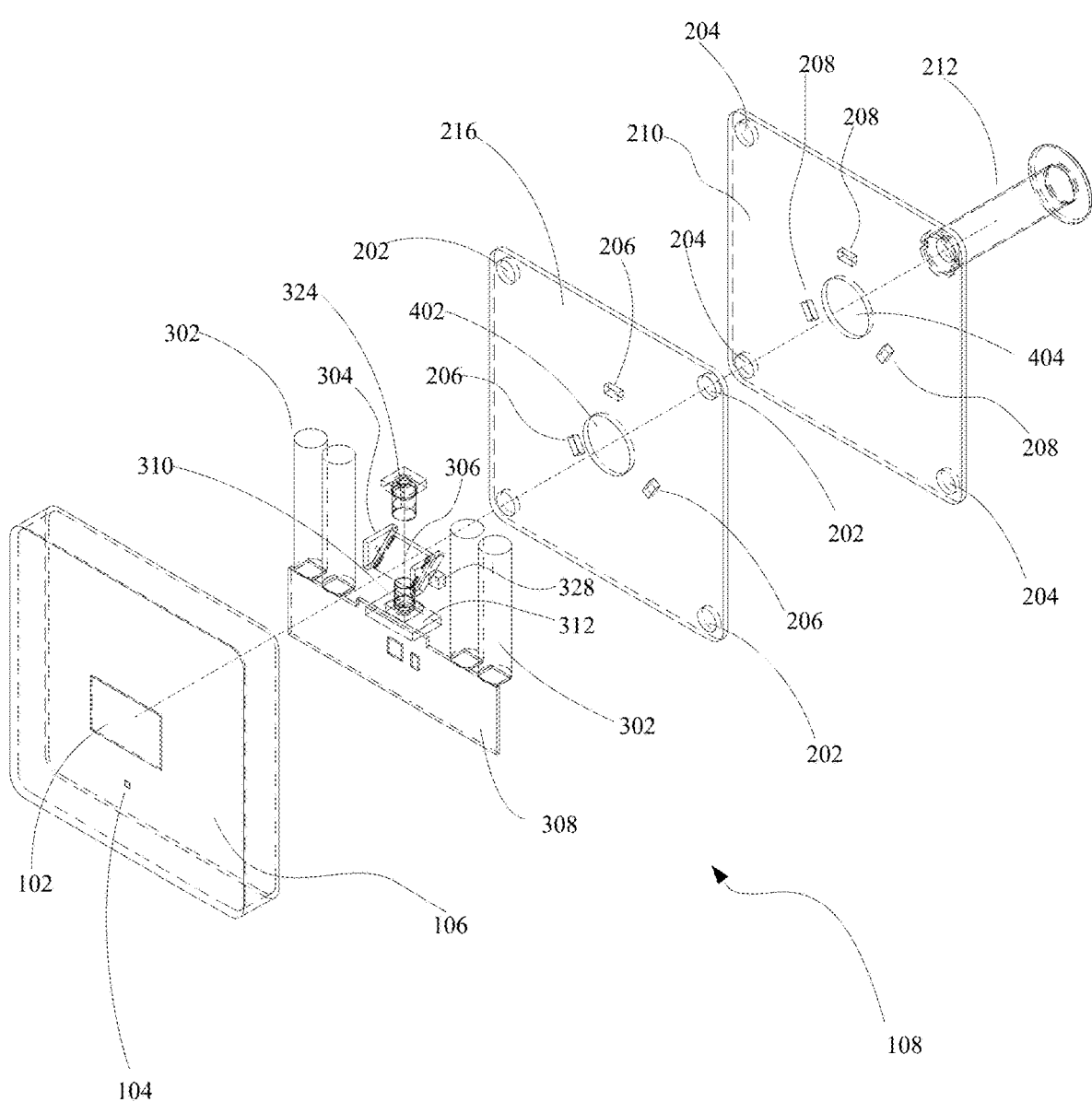

FIG. 3B shows a detailed cross-section view from FIG. 3A. Door bracket 210 is attached to door 100 by means of removable adhesive tape. Magnets 202 and magnets 204 align and pull bracket 210 and lid 216 tightly face to face. Housing 106 is rigidly attached to lid 216. Peephole viewer 212 with peephole viewer primary lens 314 are mounted on door 100. Camera attachment bracket 312 is rigidly attached to housing 106. Primary camera module 310 is attached to a bracket 312 such that its optical axis is 90 degrees offset from optical axis of peephole viewer 212. A secondary camera module 324 is attached to another bracket 312 such that its optical axis is 90 degrees offset from optical axis of peephole viewer 212, and 180 degrees offset from primary camera module 310. Mirror 306 is attached to mirror bracket 304 such that it may rotate about mirror hinge rotational axis 322 by the mirror actuator 328, which is not shown in this figure. Mirror actuator 328 is shown in FIG. 4.

The rotational motion of mirror 306 is constrained by mirror end stops 326 which are rigidly attached to mirror bracket 304. One or more mirror end-stops 326 limit the maximum mirror rotation range to 90 degrees.

The mirror may include one or more optional mirror magnet 330. In such a case, the mirror end-stops 326 may be constructed of ferromagnetic material or include a magnet in their structure. When the mirror 306 hits the end-stop 326, the mirror magnet 330 pulls the mirror flush with the end-stop and prevent it from unintentionally rotating away from the end-stop.

Mirror actuator 328 may be any type of electronic mechanical actuator such as a motor, solenoid, electromagnetic or other means of providing rotational force such that the mirror 306 may be rotated within its rotational limits defined by the end-stops 326.

An example electromagnetic actuator could follow a similar design as in the U.S. Pat. No. 6,510,632B1, "Small dot display element", and KR101487904B1, "Flip Dot Display Element using Electromagnet and Assembly Module thereof". Such a mirror flipping method is both low in electrical power requirements, and quiet, as the rotating mirror itself has very low mass, making this method a good choice for battery operation. It should be noted that any other choice of actuator design is possible, including using a linear actuator with a cam or other linear-to-rotational motion mechanism.

Main processing board 308 is also attached to housing 106. Display 102 and front proximity sensor 104 are shown on the front face of housing 106.

Figure 3C:
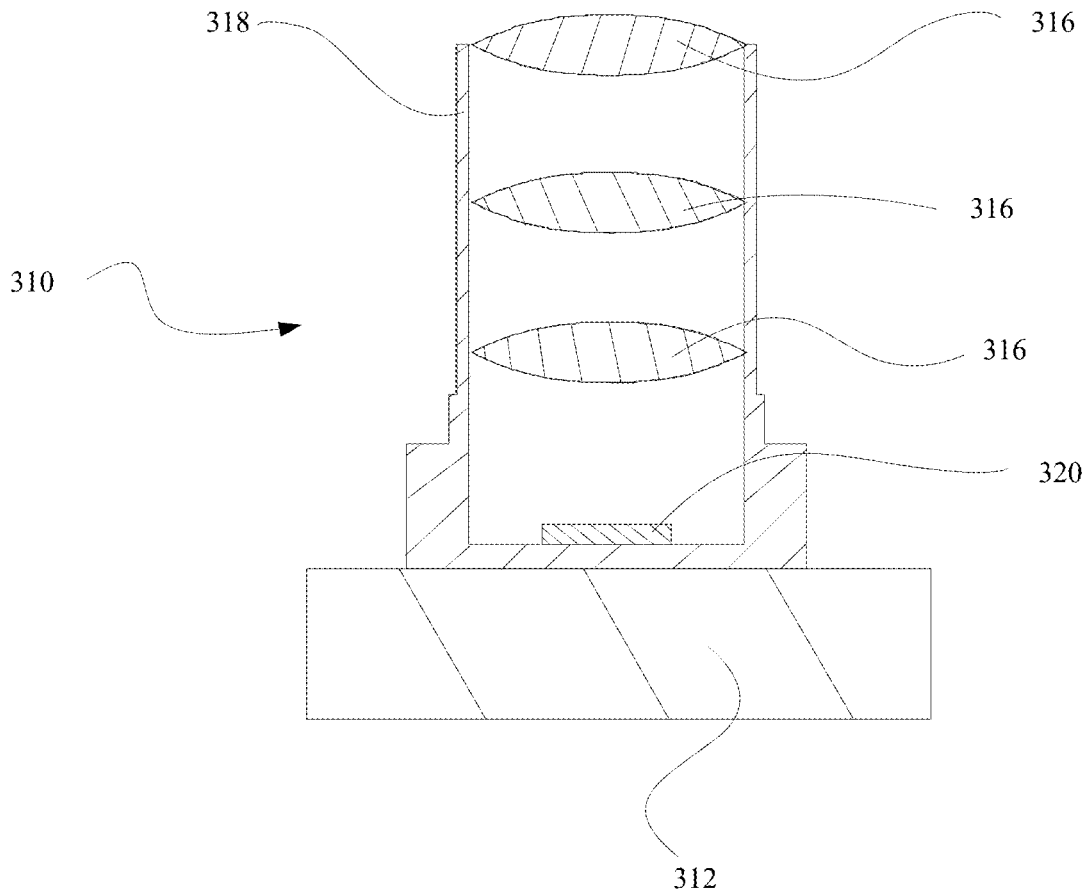

FIG. 3C shows a side cross-section view of camera module 310. One or more lenses 316 are mounted in camera lens housing 318 such that they are optically aligned with image sensor 320. Housing 318 is rigidly attached to camera attachment bracket 312.

Figure 3D:
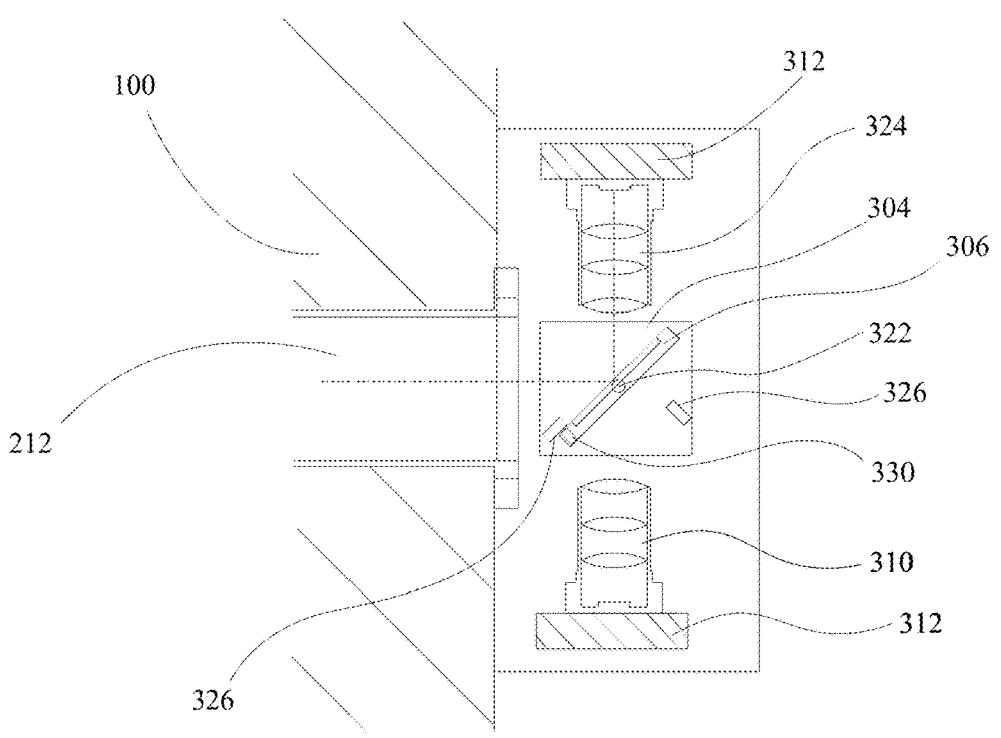

FIG. 3D shows a more detailed, close-up cross-section view of the camera modules and mirror assembly in FIG. 3B. Many features of FIG. 3B are omitted to more clearly show the optical path, mirror, and camera modules.

Figure 3E:
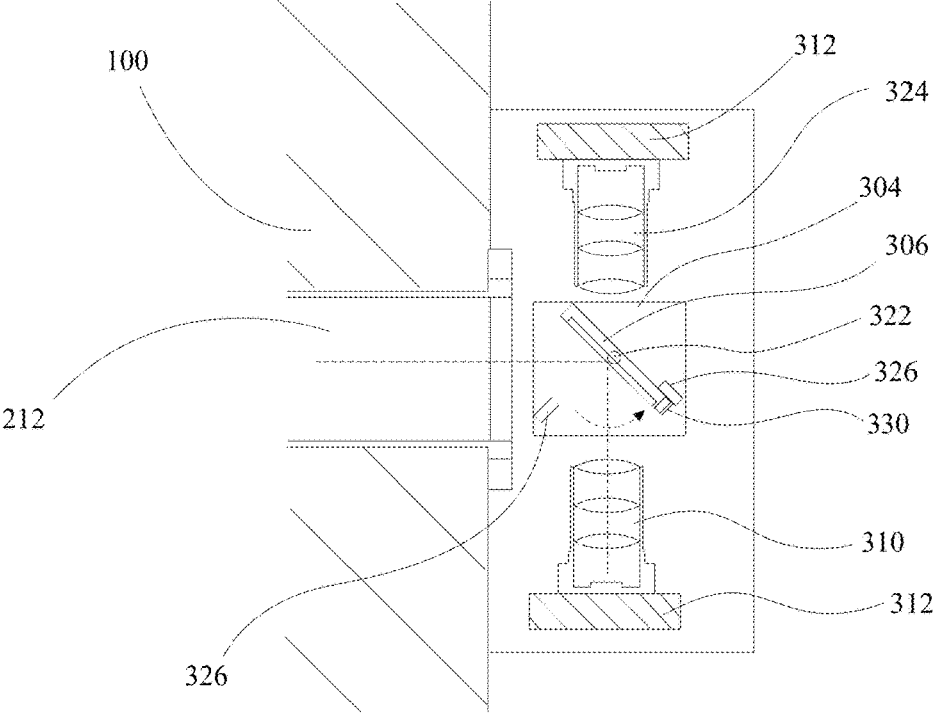

FIG. 3E shows the same close-up cross-section view as FIG. 3D, with the mirror 306 rotated 90 degrees to indicate how the mirror is operated to alter the peephole viewer's optical path.

FIG. 4 is an exploded isometric view showing an embodiment of peephole viewer camera apparatus 108. Door peephole viewer 212 defines an optical axis which is aligned with door bracket viewing aperture 404, housing lid viewing aperture 402, and mirror 306. Mirror 306 is attached to mirror bracket 304 such that it may rotate about mirror hinge rotational axis 322 (shown in FIG. 3B). Primary camera module 310 is attached to a bracket 312 such that its optical axis is 90 degrees offset from optical axis of peephole viewer 212. A secondary camera module 324 is attached to another bracket 312 such that its optical axis is 90 degrees offset from optical axis of peephole viewer 212, and 180 degrees offset from primary camera module 310. Some feature labels are omitted from this figure; please refer to FIG. 3B for cross reference. Display 102 is an optional feature. Front proximity sensor 104 is also an optional feature.

Magnet 204 and magnet 202 are each preferably a strong magnet such as one made of neodymium. However, magnet 204 may be replaced by a simple piece of ferromagnetic metal such as steel. It should be noted that fewer or greater number of magnets 202 and magnet 204 can be used, and need not be located in the corners of bracket 210. Similarly, alignment features 206 and 208 may be arranged in any pattern, and there may be more or fewer features than depicted in the figure.

Door bracket 210 may made from a rigid material such as ABS plastic. Alternatively, door bracket 210 may be a thin, flexible material such as a thermoplastic.

Batteries 302 provide power to the apparatus 108. Although not shown in the figures, a connector may be added to the peephole viewer camera apparatus 108 for charging the batteries 302 and providing power to the apparatus 108, which may bypass usage of the batteries 302 when plugged in to a power source. It should be noted that the peephole viewer camera apparatus 108 may be plugged in via power cable while mounted on the door. The power cable may be routed to the door hinge, and along the wall to a power supply, preferably plugged into a wall outlet. Such a power supply could be a simple USB charger or similar. In this case, the peephole viewer camera apparatus 108 may operate without as limited constraints on power usage.

Operation—FIGS. 1, 2, 3A, 3B, 3C, 3D, 3E, 4, 4A, 4B—Embodiment A

As shown in FIG. 3B and FIG. 4, Door peephole viewer 212 defines an optical axis which is aligned with door bracket viewing aperture 404, housing lid viewing aperture 402, and mirror bracket 304. Mirror 306 is attached to mirror bracket 304 such that it may rotate about mirror hinge rotational axis 322.

FIG. 3D depicts a close-up view of the mirror 306 in its default rotational configuration. In this configuration, the face of mirror 306 is 45 degrees offset from the optical axis of peephole viewer 212. Secondary camera module 324 is attached to bracket 312 such that its optical axis is 90 degrees offset from optical axis of peephole viewer 212. In this configuration, mirror 306 redirects the peephole viewer 212 optical path such that it aligns with secondary camera module 324. The view seen through the peephole will pass through the camera lenses 316 and resolve the image on image sensor 320 (shown in FIG. 3C). Peephole viewer 212 offers a wide angle view. One or more lenses 316 within camera module 310 are arranged such that they alter the field of view seen through the peephole viewer such that it covers image sensor 320. In this configuration, the secondary camera module 324 has a clear view through the peephole viewer 212, redirected by mirror 306.

FIG. 3E depicts a close-up view of the mirror 306 when it is rotated by 90 degrees. In this configuration, the face of mirror 306 is 135 degrees offset from the optical axis of peephole viewer 212 (or in other wording, −45 degrees). Primary camera module 310 is attached to bracket 312 such that its optical axis is 90 degrees offset from optical axis of peephole viewer 212. In this configuration, mirror 306 redirects the peephole viewer 212 optical path such that it aligns with primary camera module 310. In this configuration, the primary camera module 310 has a clear view through the peephole viewer 212, redirected by mirror 306.

The rotation of mirror 306 can be controlled by mirror actuator 328, by means of control signals from the main processing board 308, and CPU and video processor 414. Thus, by controlling the rotation of mirror 306, the view through peephole viewer 212 may be directed to either primary camera module 310 or secondary camera module 324.

One advantage of this design is that one camera module may be a low resolution variety which operates on ultra-low power, offering long battery life. The other camera module may be a high quality, high resolution module. In a best-case scenario, the apparatus would operate in low power mode most of the time, by selecting the low resolution, ultra-low power camera module's view. When activity is detected, the mirror can be rotated such that the high resolution, high power camera module's view is active through the peephole viewer 212. When one camera module is active, the other camera module may be powered down to conserve power and extend the apparatus' battery life.

Removable camera apparatus assembly 218 blocks the person's view through the door peephole viewer 212. In some cases, a person inside may want to look outside through the door peephole viewer 212 to verify that it is safe to open the door. FIG. 2 illustrates how assembly 218 may be separated from the door bracket assembly 214. Assemblies 218 and 214 are held firmly together by magnets 202 and 204. In addition, alignment features 206 and 208 aid in keeping the assemblies 218 and 214 aligned and prevents them from sliding or rotating with respect to each other. This maintains that the optical axis of peephole viewer 212 will project correctly onto mirror 306, and finally onto image sensor 320 as shown in FIG. 4.

Once assemblies 214 and 218 are separated, the user may look unobstructed through peephole viewer 212. When done looking, the user places removable camera apparatus assembly 218 against assembly 214 again. It will snap into place from the magnetic force of magnets 202 and 204. The alignment features 206 and 208 ensure that the two assemblies 214 and 218 are aligned. Once in place, the optical path through peephole 212 will pass directly onto image sensor 320.

Figure 4A:
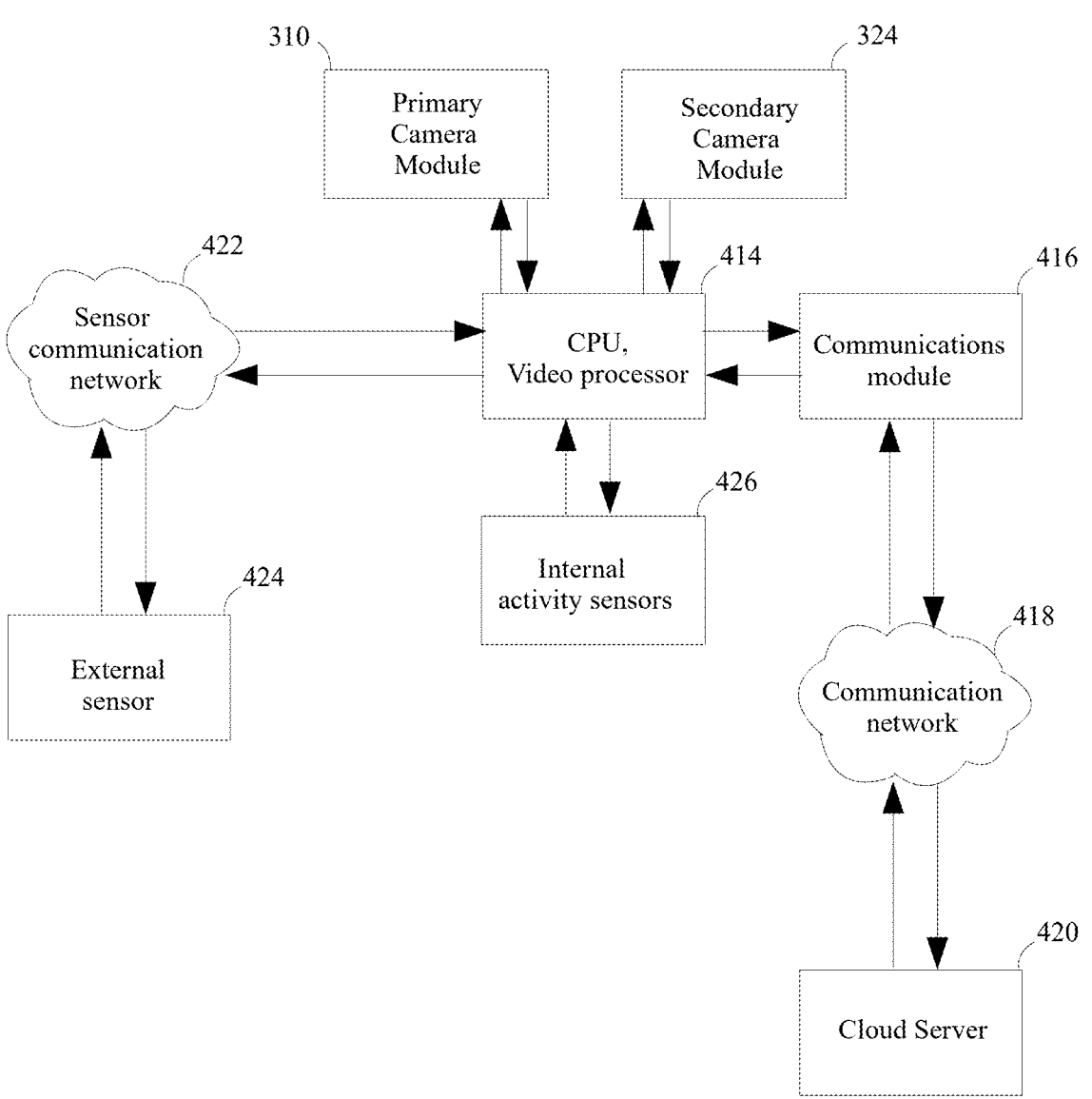

FIG. 4A shows an overview diagram of the system's data flow. The camera apparatus comprises CPU and video processor 414, primary camera module 310, secondary camera module 324, internal activity sensors 426, and communications module 416. The CPU and video processor 414 control and read image data from camera module 310 and secondary camera module 324. Primary camera module 310 and secondary camera module 324 are shown as part of the camera apparatus in FIG. 3B and FIG. 4. The CPU and video processor 414 also transmit and receive data via communications module 416. Transmission and reception of data pass through communications network 418, and reaches an endpoint at cloud server 420. Cloud server 420 may be a physical server on the internet, a local computer acting as a server on a local area network, or a virtual cloud platform such as Amazon AWS, Microsoft Azure, or Google Cloud Platform.

CPU 414 may also communicate with internal activity sensors 426. These sensors 426 may be mounted within camera apparatus 108. Sensors 426 may include inertial sensors such as gyroscope, accelerometer, magnetometer, barometric, or image-based sensor. The sensors 426 may also include a microphone or other type of vibration sensor. These sensors' output can be processed by CPU 414 to determine if some activity has occurred. For instance, the accelerometer, gyro, or magnetometer sensor may determine whether the door has rotated. The barometric sensor can report a change in barometric pressure which occurs when the door is opened. The accelerometer, vibration, or microphone sensor may be used to report if a door knock has been detected. The microphone sensor may also be used to determine whether human voices are detected outside of the door.

In this embodiment, the Communications module 416 transmits and receives data to the communication network 418 via 802.11 TCP/IP communication via WiFi. However, it should be noted that the method of communication can be any type of network protocol, wired or wireless. This includes WiFi, Bluetooth, Zibgee, Ethernet, RS485 and others.

The CPU and video processor 414 also may communicate with external sensor 424 via a sensor communication network 422. This sensor communication network 422 may be wired or wireless, and use one or more communication protocols such as WiFi, Bluetooth, Zigbee, Ant or other wireless protocols. Similarly, sensor communication network 422 may use a wired connection over Ethernet, RS485, I2C, SPI, UART, or other wired communication protocol. More than one external sensor may communicate with the CPU and video processor 414. A variety of types of external sensors may be used, including passive infrared proximity sensors, time-of-flight proximity sensors, microphones, LIDAR, other imaging sensors, accelerometers, gyroscopes, magnetometers, barometric pressure sensors, microphones, image sensors, or other types of sensors. Later embodiments describe implementations of certain external sensors.

One internal activity sensor 426 shown in FIG. 2 is front proximity sensor 104. In this embodiment, sensor 104 is a time-of-flight proximity sensor which can measure the approximate distance of an object in its field of view. A nominal field of view for this sensor is 30 degrees. Any object detected at near the height of the proximity sensor 104 is likely a person approaching the door. Thus, CPU 414 can monitor proximity sensor 104. The CPU and video processor 414 is also connected to display 102. When the CPU determines that a person is detected by proximity sensor 104, it can turn on display 102 and show the current video stream from camera module 310. The CPU and video processor 414 may also perform face detection and face recognition on the images from camera module 310. In this case, it may show an overlay with face recognition metadata on display 102. Such metadata could include a name or secondary photo of the detected person.

Note that the sensor 104 may alternatively be an image sensor with one or more lenses, configured to detect if a person is present. Such a sensor may also perform localization of the person relative to the device. Many AI models can run on embedded devices, drawing only micro-amps of power, to allow for long battery life while performing person detection and localization via AI inference.

Door bracket 210 is designed to be simple to install on the door 100. The back side of door bracket 210 may be covered in an adhesive tape. The adhesive tape can have a protective coating. When the coating is peeled off of the tape, the bracket 210 can be positioned over the peephole viewer 212 such that aperture 404 is centered on peephole viewer 212, and pressed against to the door 100. Once pressed against the door, it will be held firmly in place by the adhesive. One example adhesive tape is the 3M command strip. If the user wants to remove the bracket from the door, the user can peel back bracket 210 from the door. The removable adhesive tape will leave no residue on the door. If made of a flexible material, door bracket 210 can be made of a flexible, thin material to make it easier to peel back during removal. Using a thin, flexible material for bracket 210 also makes manufacturing more economical.

Figure 4B:
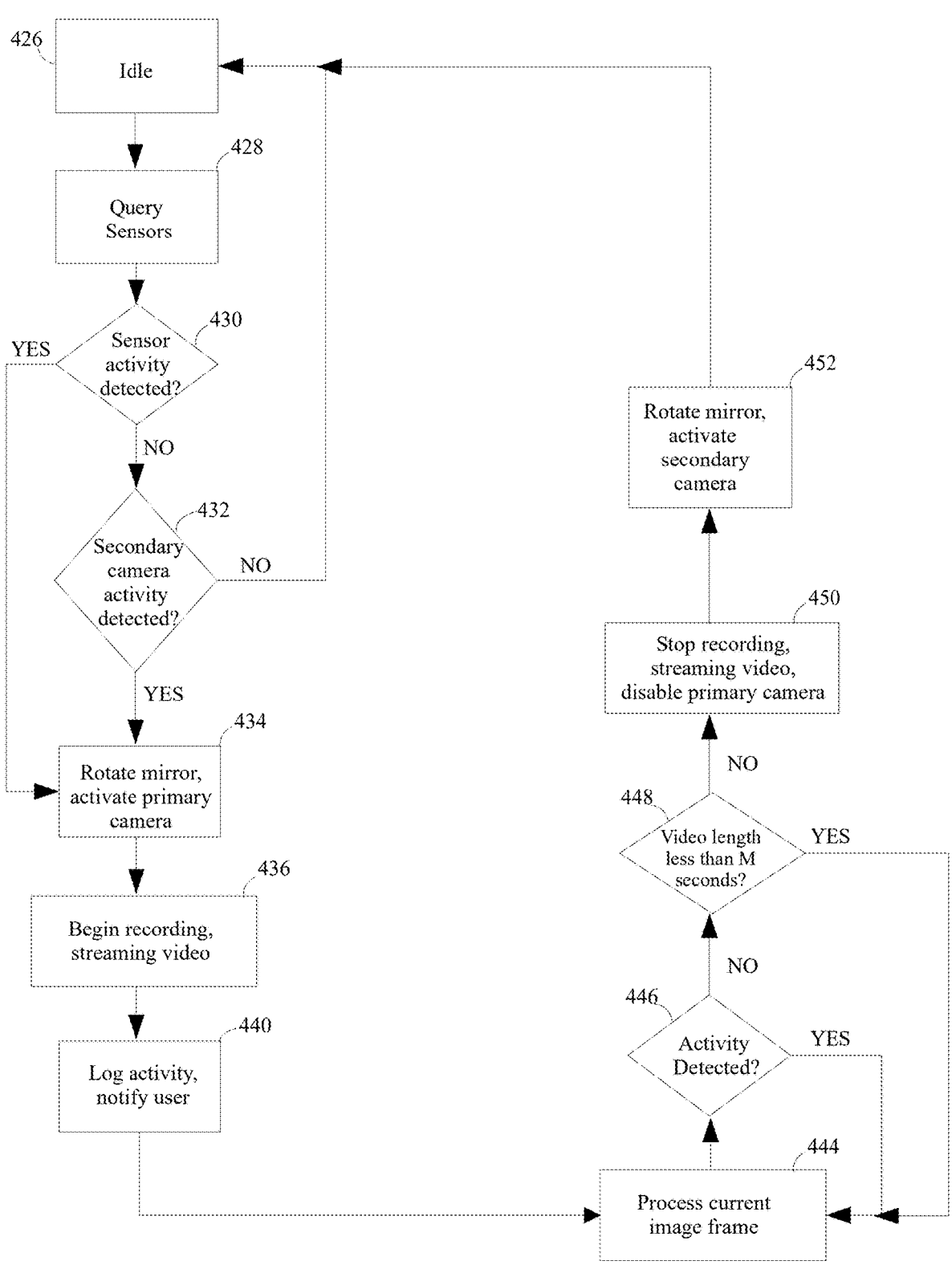
Figure 4C:
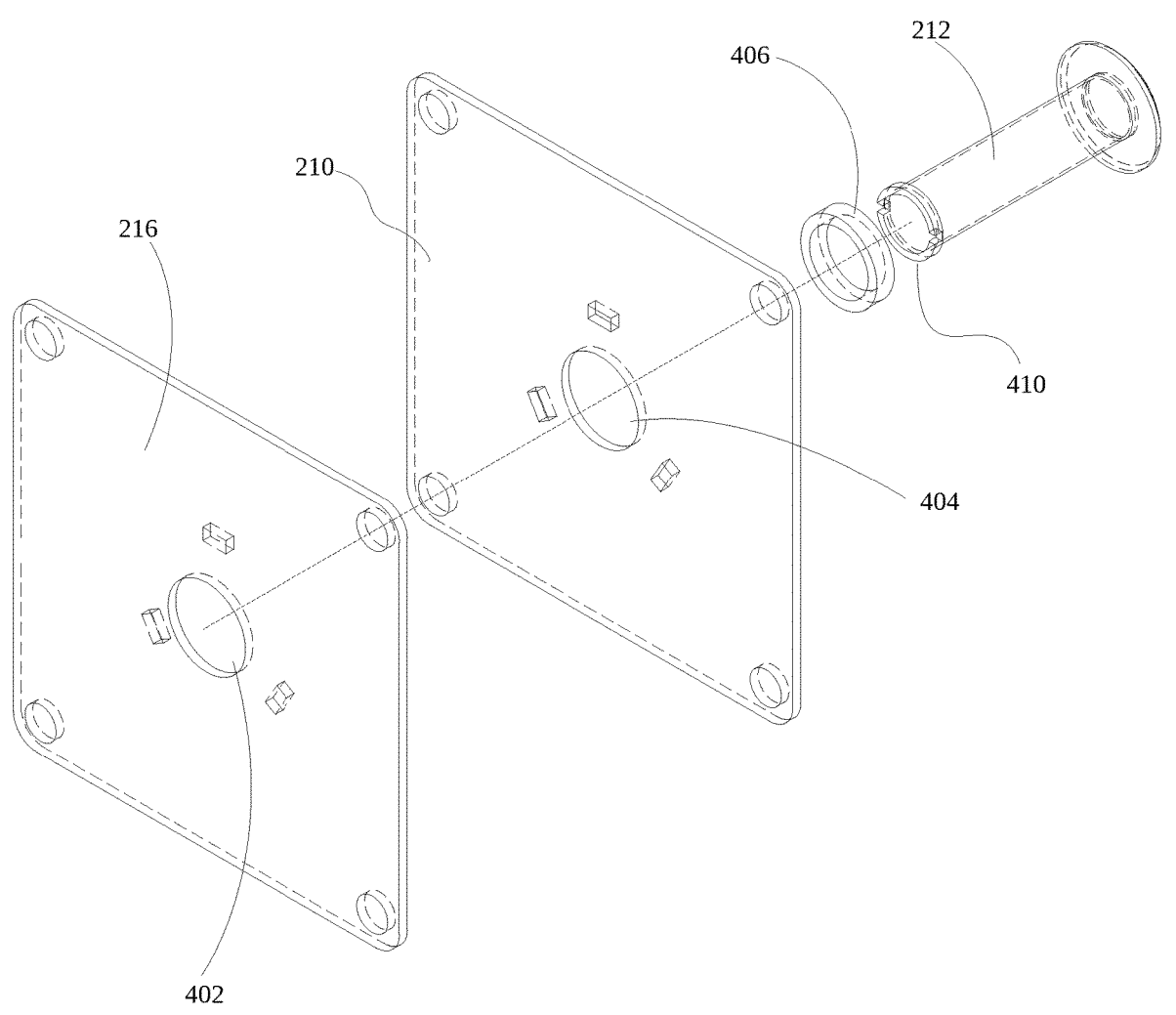
Figure 4D:
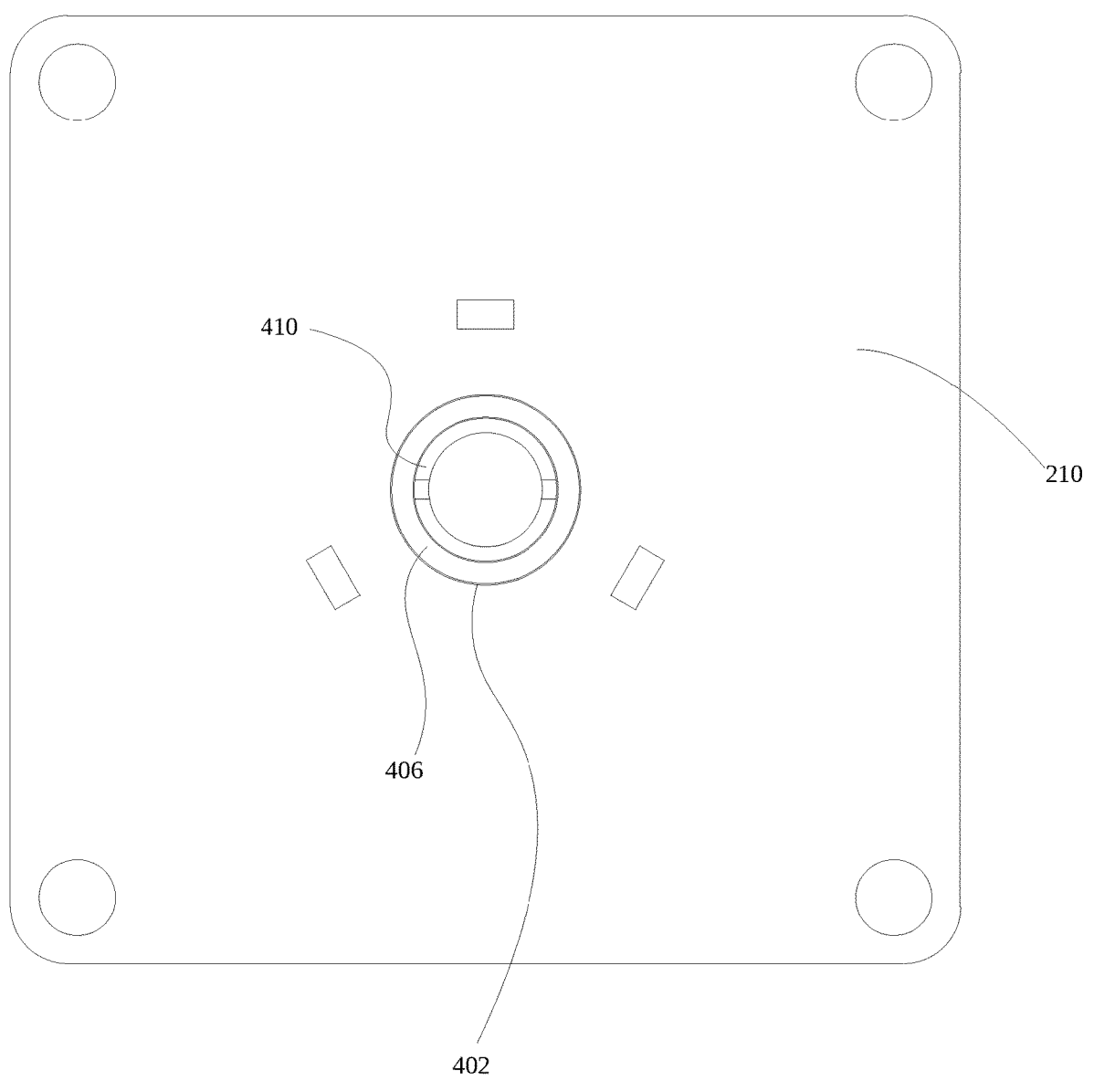

FIG. 4B is a flowchart showing the operating process for the peephole viewer camera apparatus 108 described in this embodiment. It begins at step 426, in which the device enters idle state. Upon entering this state, the device enacts a low power mode to conserve battery life. CPU 414, primary camera module 310, and communications module 416 all enter low power state. Mirror actuator 328 rotates the mirror into a configuration represented by FIG. 3D. In this configuration, secondary camera module 324 is enabled and has a clear view through the peephole viewer 212.

When secondary camera module 324 is enabled, it may continually capture images and detect whether activity has occurred in the frame. This detection may be performed by changes in luminance values, object, or pedestrian detection, or by other activity detection means which are known to those skilled in the art of activity detection from video data. Secondary camera module 324 may run in low resolution, ultra-low power mode continually, providing long battery life. Image sensors configured to perform in this manner have recently become commercially available.

In the next step 428, the CPU 414 queries any internal sensors 426 and external sensors 424 for activity. Such activity could be determined by an external proximity or occupancy sensor indicating that a person or animal is nearby. Similarly, an internal accelerometer, gyro, or magnetometer internal sensor may determine whether a door motion activity has occurred. An internal barometric sensor may report a change in barometric pressure which occurs when the door is opened. An internal accelerometer, vibration, or microphone sensor may be used to report activity if a door knock has been detected. The microphone sensor, if present, may be used to determine whether human voices are detected outside of the door. Any of these or other internal sensors 426 and external sensors 424 may be used to determine whether activity is detected. Note that any specific individual sensors 424 or 426 may be excluded from use in determining step transition in this flowchart.

In the next step 430, if sensor activity is detected then transition to step 434. Otherwise, if internal sensors 426 and external sensors 424 report no activity is detected, then transition to step 432. In step 432, if the secondary camera module 324 detects activity, transition to step 434. Otherwise transition back to step 426, idle state.

In step 432, secondary camera module 324 may run activity detection algorithms internally, or make use of CPU and video processor 414 to do so. CPU and video processor 414 may include artificial intelligence acceleration hardware to allow for fast AI inference execution, such as facial detection and facial recognition. In this case, the CPU stores the results in memory, which may include whether a face is detected, and if so, the metadata attached to the detected face. This metadata may include the person's id, name and a secondary image of the person.

Upon entering step 434, mirror actuator 328 rotates the mirror into a configuration represented by FIG. 3E. The primary camera module 310 is enabled and then transition to step 436. Primary camera module 310 may employ a high quality, high resolution image sensor, which draws more power than the secondary camera module but offers better image quality and performance.

In step 436, the CPU and video processor 414 begins recording the video stream from primary camera module 310. The CPU 414 may write the video stream to local nonvolatile storage. In addition, it may begin streaming the video stream to cloud server 420 via communications network 418. As described previously, this may be an internet server, or a local server on the local area network. then transitions to step 440.

In step 440, log the detected activity to memory and nonvolatile storage. The logged data may include metadata of any detected person via face recognition, as well as a current timestamp. The logged data may also include any type of activity detected by the internal sensors 426 and external sensors 424. Then notify the user. This may optionally include enabling display 102 and showing the current video stream from camera module 310. If face recognition metadata is available, an overlay with face recognition metadata may be shown on display 102. Such metadata could include a name or secondary photo of the detected person. This step may also send a push notification to show an alert on the user's phone or other connected device such as a smart screen device. Examples of such a device are Google Nest, Amazon Echo Show and Facebook Portal. This step 440 may also send a message to a server on the Internet as well. After step 440 is complete, transition to step 444.

In step 444, process the current image frame from the camera module 320, performing person and optionally face detection on the image frame. Transition to step 446. Here, determine if activity is detected. If a person is detected, or internal sensors or external sensors report activity detected, then transition back to step 444. However, if no activity is detected then transition to step 448.

In step 448, test if the duration of the current video recording is less than M seconds. A nominal value for M is ten seconds. If the duration is less than M seconds, then transition back to step 444 and process another frame. However, if the video duration is greater than or equal to M seconds, then transition to step 450.

In step 450, stop recording and stop streaming the video. Disable the primary camera module 310 to conserve power. If recording to local nonvolatile storage, then close the file. Then transition to step 452, in which mirror actuator 328 rotates the mirror into a configuration represented by FIG. 3D and enables secondary camera module 324. Finally, transition to step 426 and enter idle, low power state.

DETAILED DESCRIPTION—FIGS. 4E, 4F, 4G—EMBODIMENT A1

Figure 4E:
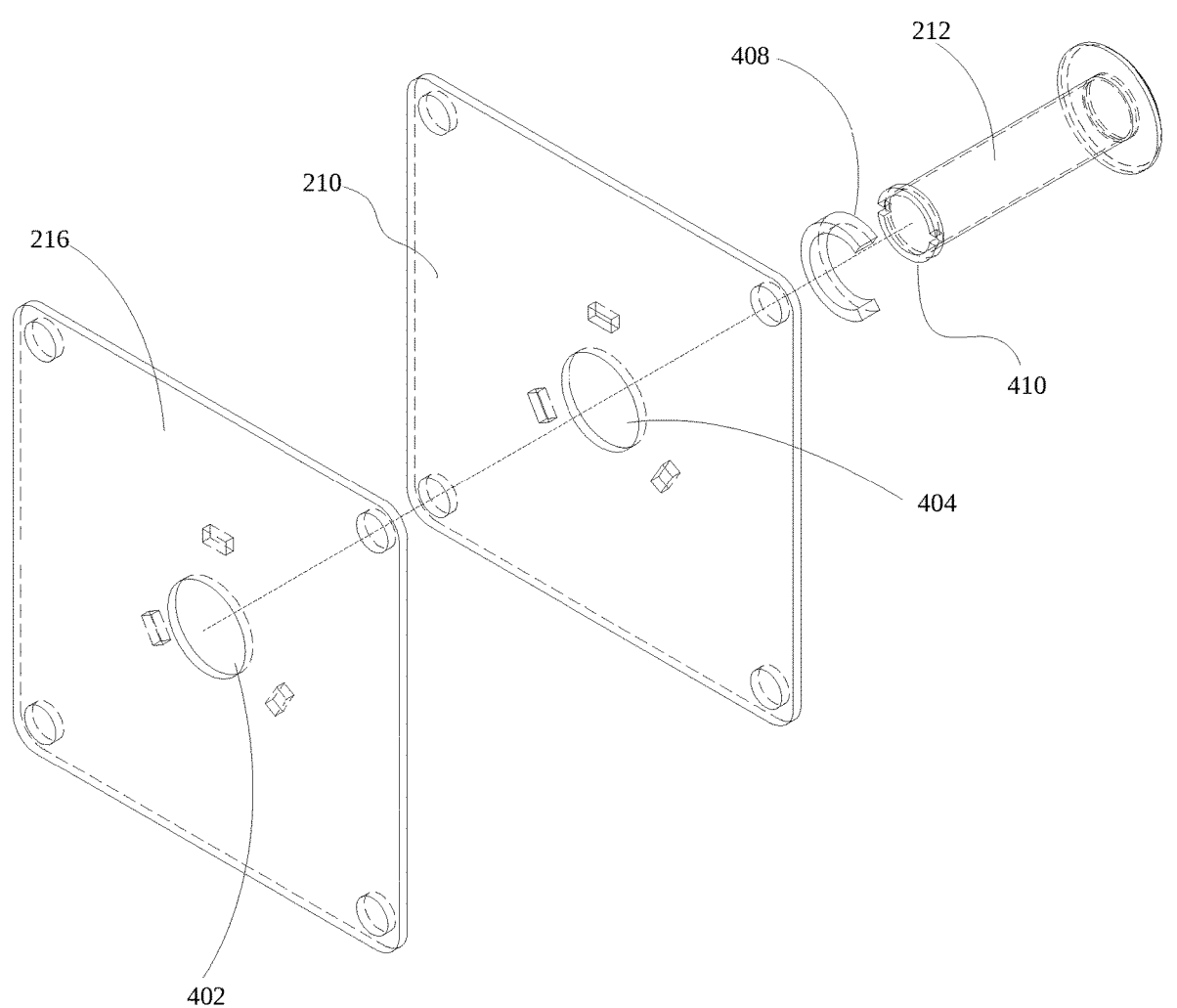
Figure 5:
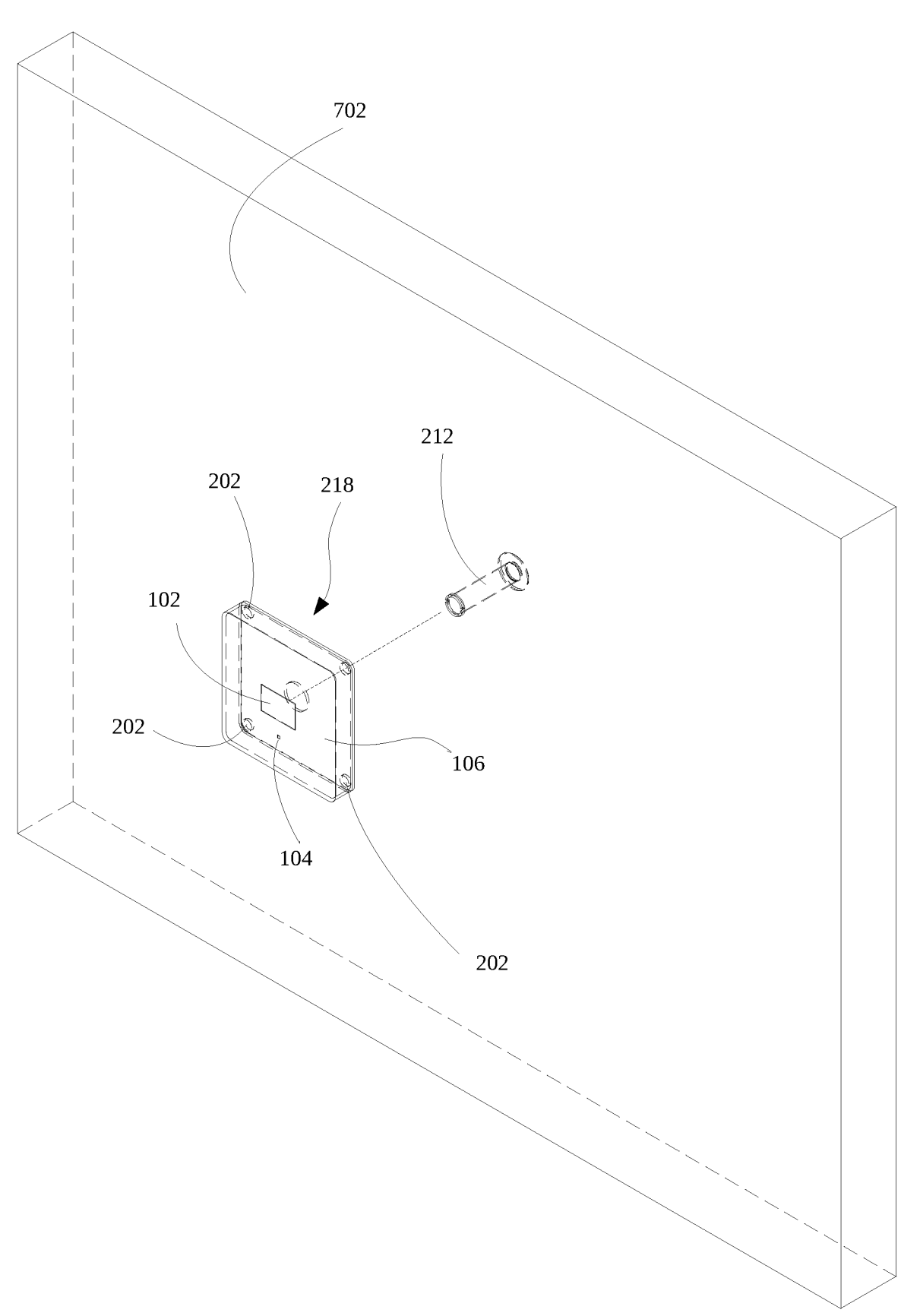
Figure 6:
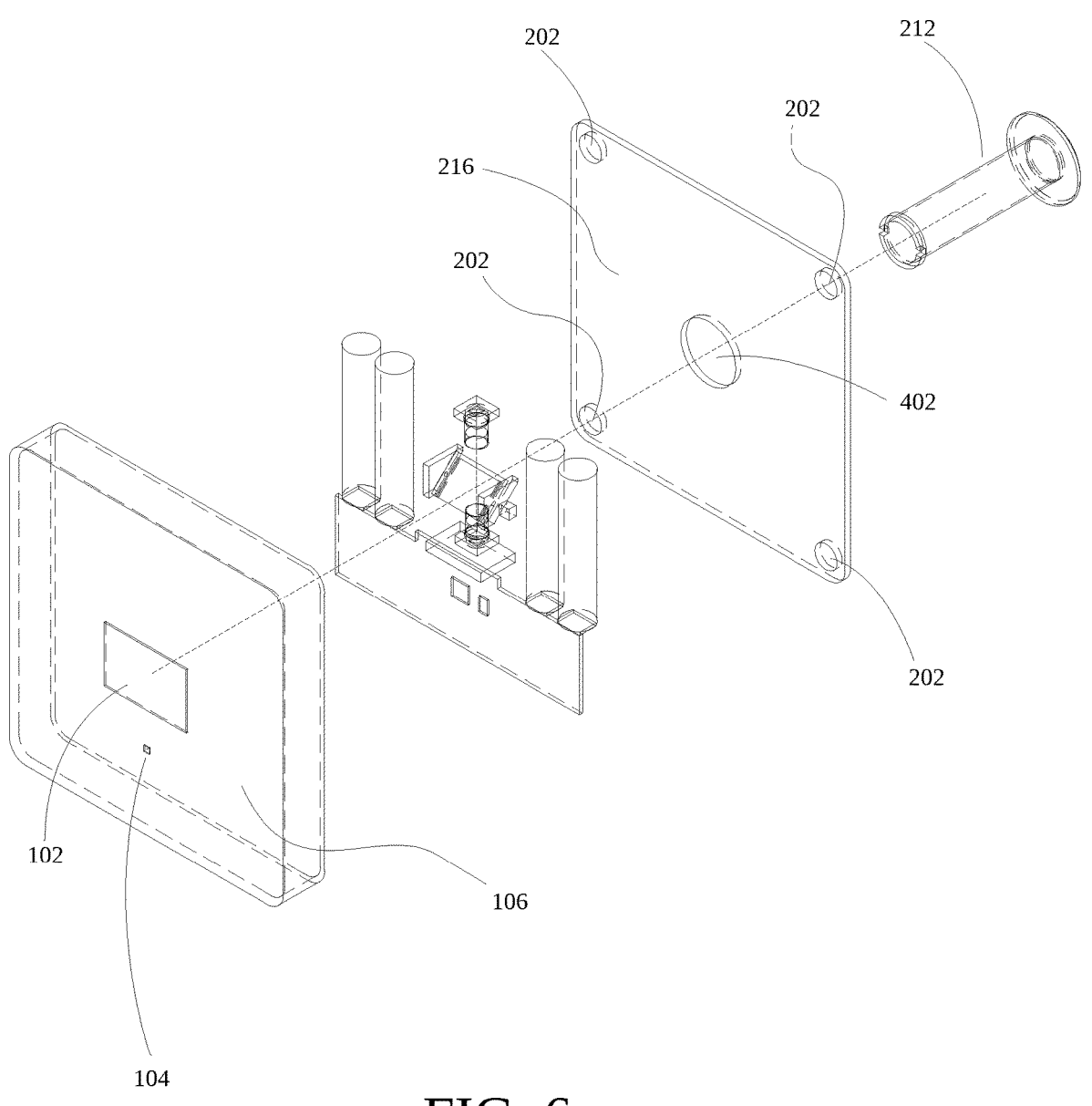

Embodiment A1 is a variation on embodiment A. FIG. 4E shows an exploded isometric view of door bracket 210 and housing lid 216 with added door bracket support ring 406. Support ring 406 has an inner diameter which matches the outer diameter of door peephole viewer front ring 410. Support ring 406 has an outer diameter which matches the diameter of door bracket viewing aperture 404 and also matches the diameter of housing lid viewing aperture 402.

FIG. 4F shows a front view of door bracket 210 with added door bracket support ring 406. Support ring 406 has an inner diameter which matches the outer diameter of door peephole viewer front ring 410. Support ring 406 has an outer diameter which matches the diameter of door bracket viewing aperture 404. When mounted on the door, the door peephole viewer front ring 410 provides support for the door bracket 210 against gravity, to aid in preventing the bracket 210 from sliding along the surface of the door.

Support ring 406, if long enough, may extend through both aperture 404 and aperture 402, thus providing support for both the door bracket 210 and removable camera apparatus assembly 218. Alternatively, the ring 406 may be designed to extend only as far as bracket 210.

FIG. 4G shows an alternative design for support ring 406. It is replaced by support ring 408, which has a notch cut such that it forms a "C" shape. It serves the same purpose as ring 406. However, ring 408 has a gap which allows certain types of peephole viewers with privacy covers to allow placement of the ring 408 which would not be possible with ring 406.

It should be noted that the support ring 406 and 408 may have an adhesive backing to aid in preventing any sliding motion after installation.

Operation—FIGS. 4E, 4F, 4G—Embodiment A1

Embodiment A1 adds a support ring 406. During installation, the user takes support ring 406 and places it onto the door such that it fits snugly around peephole viewer front ring 410. Then the user places the door bracket 210 onto the door with removable adhesive tape, such that door bracket viewing aperture 404 fits snugly against the outer circumference of ring 406. When mounted on the door, the door peephole viewer front ring 410 provides support for the door bracket 210 against gravity, to aid in preventing the bracket 210 from sliding along the surface of the door.

Ring 406 can be replaced with ring 408, which has a cutout to make a "C" shape, but offers the same functionality. This allows installation on doors which have a pivoting privacy cover attached to the peephole viewer front ring 410.

Note that ring 406 and ring 408 of this embodiment may be added as a feature in other embodiments described herein.

DETAILED DESCRIPTION—FIGS. 1, 2, 3A, 3C, 3F, 3G, 4—EMBODIMENT B1

Embodiment B1 is very similar to embodiment A. However, in this embodiment the peephole viewer camera apparatus has a different physical arrangement of primary camera module 310, secondary camera module 324, mirror hinge rotational axis 322, and mirror 306.

Figure 3F:
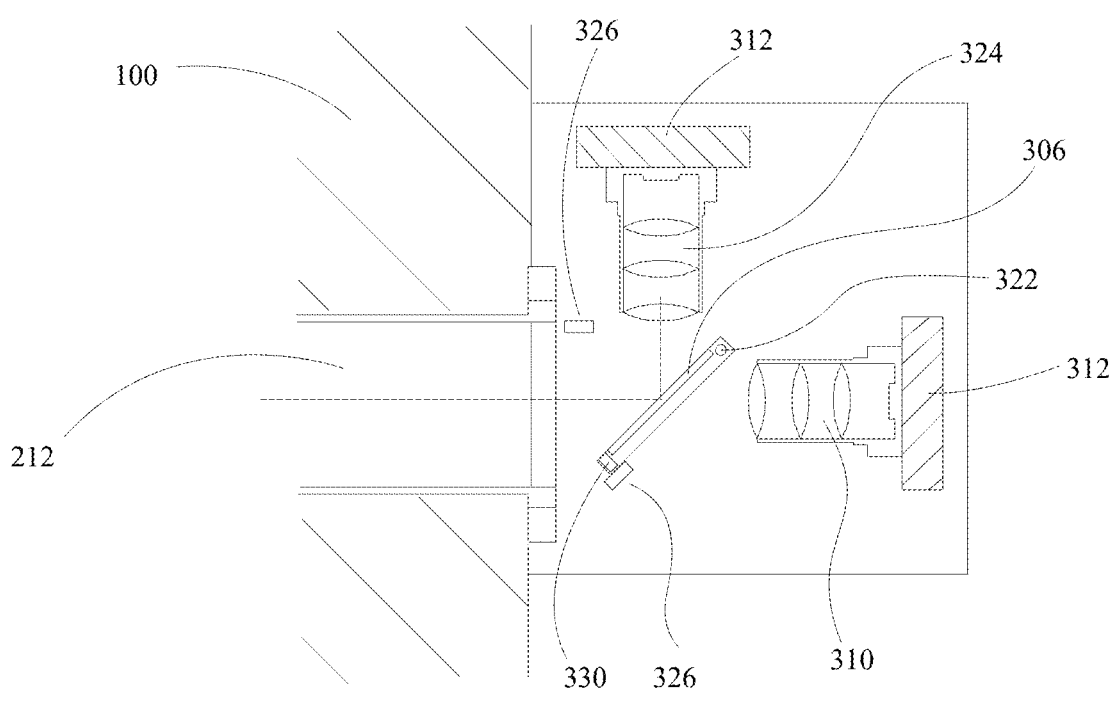

FIG. 3F depicts a close-up cross-section view of peephole viewer camera apparatus 108 installed on the door in this embodiment. Many features of the peephole viewer camera apparatus 108 are omitted to more clearly show the optical path, mirror, and camera modules.

Figure 3G:
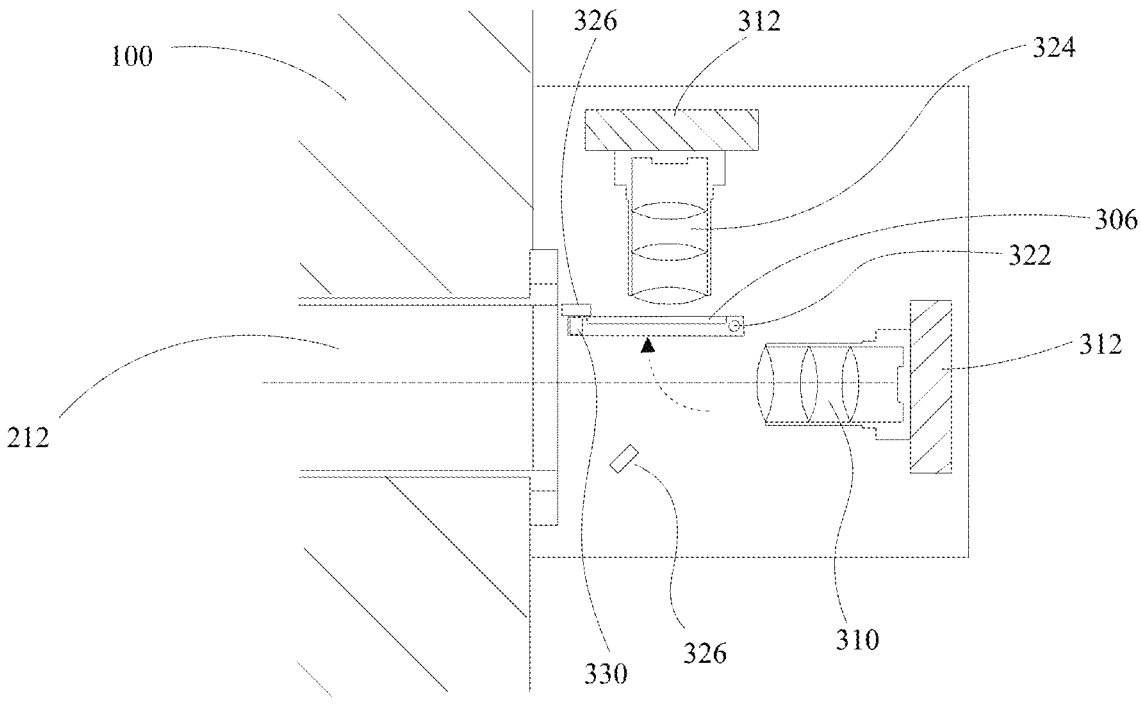

FIG. 3G shows the same cross-section view as FIG. 3F, with the mirror 306 rotated 45 degrees to indicate how the mirror is operated.

Peephole viewer 212 is mounted on door 100. Primary camera module 310 is attached to a bracket 312 such that its optical axis is aligned with the peephole viewer 212 optical axis. A secondary camera module 324 is attached to another bracket 312 such that its optical axis is 90 degrees offset from optical axis of peephole viewer 212, and 90 degrees offset from primary camera module 310. Mirror 306 is attached such that it may rotate about mirror hinge rotational axis 322. The mirror actuator 328 (not shown in this figure), is connected to the mirror 306. A placement of mirror actuator 328 is shown in FIG. 4.

In FIG. 3F, the mirror 306 is depicted in its rest position, in which its face is 45 degrees offset from the optical axis of peephole viewer 212, and 45 degrees offset from secondary camera module 324. In this configuration, the mirror redirects the peephole viewer's optical axis such that it projects its image onto secondary camera module 324. FIG. 3G shows a configuration in which the mirror 306 is rotated up by 45 degrees. In this configuration, the primary camera module 310 has a clear view through the peephole viewer 212, unobstructed by mirror 306.

The mirror 306 may be rotated up to 45 degrees by mirror actuator 328. One or more mirror end-stops 326 may be placed to prevent the mirror from rotating further than 45 degrees. The rotational motion of mirror 306 is constrained to a maximum travel of 45 degrees by one or more mirror end-stops 326.

The mirror may include an optional mirror magnet 330. In such a case, the mirror end-stops 326 may be constructed of ferromagnetic material or include a magnet in their structure. When the mirror 306 hits the end-stop 326, the magnet will pull the mirror flush with the end-stop and prevent it from unintentionally rotating away from the end-stop.

Mirror actuator 328 may be any type of electronic mechanical actuator such as a motor, solenoid, electromagnetic or other means of providing rotational force such that the mirror 306 may be rotated within its rotational limits defined by the end-stops 326. As noted in Embodiment A, many other types of actuator are possible and may be selected.

Operation—FIGS. 1, 2, 3A, 3C, 3F, 3G, 4, 4A, 4B—Embodiment B1

The operation of embodiment B1 is very similar to that of embodiment A. FIG. 4A shows an overview diagram of the system's data flow, which is the same as in embodiment A.

FIG. 4B is a flowchart showing the operating process for the peephole viewer camera apparatus 108 described in this embodiment. It is largely the same as in embodiment A, with the following key differences.
1) In step 426, in which the device enters idle state, the mirror actuator 328 rotates the mirror 306 into a configuration represented by FIG. 3F.
2) In step 434, the mirror actuator 328 rotates the mirror 306 into a configuration represented by FIG. 3G.
3) In step 452, the mirror actuator 328 rotates the mirror 306 into a configuration represented by FIG. 3F.

DETAILED DESCRIPTION—FIGS. 1, 2, 3A, 3C, 3H, 3J, 4—EMBODIMENT B2

Embodiment B2 is very similar to embodiment A. However, in this embodiment the peephole viewer camera apparatus has a different physical arrangement of primary camera module 310, secondary camera module 324, mirror hinge rotational axis 322, and mirror 306.

Figure 3H:
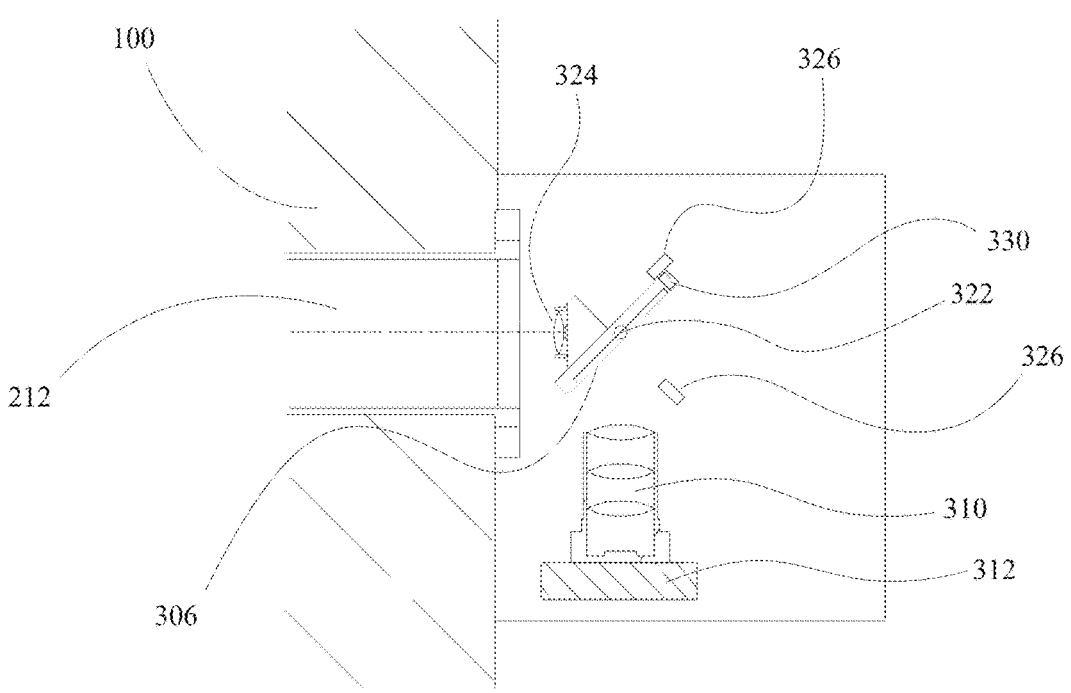

FIG. 3H depicts a cross-section view of peephole viewer camera apparatus 108 installed on the door in this embodiment. Many features of the peephole viewer camera apparatus 108 are omitted to more clearly show the optical path, mirror, and camera modules.

In this arrangement, secondary camera module 324 is rigidly attached to the mirror 306. Although not shown here, secondary camera module 324 may be connected to main processing board 308 by a flat flexible cable, to allow for power and data transfer without hindering the mirror 306 rotation.

Figure 3J:
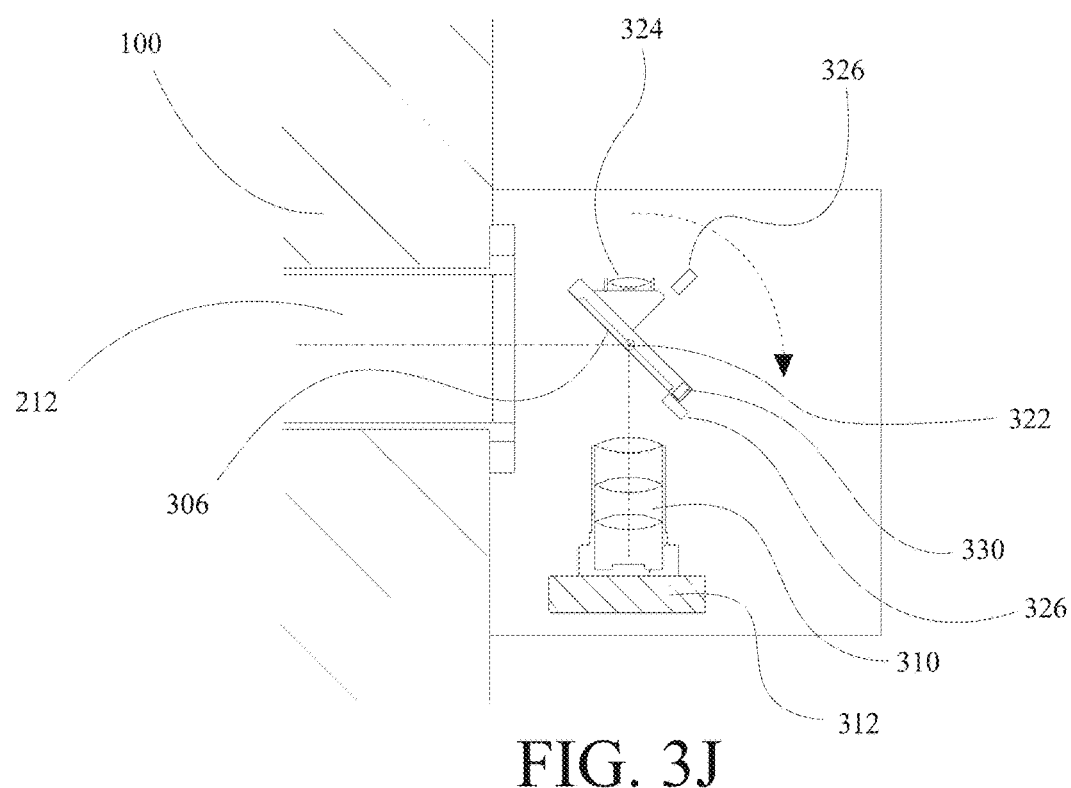

FIG. 3J shows the same cross-section view as FIG. 3H, with the mirror 306 rotated 90 degrees to indicate how the mirror is operated.

Peephole viewer 212 is mounted on door 100. Primary camera module 310 is attached such that its optical axis is offset by 90 degrees from the peephole viewer 212 optical axis. Mirror 306 is attached such that it may rotate about mirror hinge rotational axis 322. The mirror actuator 328 (not shown in this figure), is connected to the mirror 306. A placement of mirror actuator 328 is shown in FIG. 4. A secondary camera module 324 is rigidly attached to mirror 306 such that its optical axis is 135 degrees offset from mirror's face.

In FIG. 3H, the mirror 306 is depicted in its rest position, in which its face is 135 degrees offset from the optical axis of. In this configuration, the secondary camera module 324 is optically aligned with the peephole viewer 212.

FIG. 3J shows a configuration in which the mirror 306 is rotated up by 90 degrees. In this configuration, the mirror's face is now offset from both the peephole viewer 212 optical axis and the primary camera module 310 optical axis by 45 degrees. This redirects the peephole viewer's optical axis such that it projects its image onto primary camera module 310. In this configuration, the primary camera module 310 has a clear view through the peephole viewer 212, redirected by mirror 306.

In this embodiment, mirror 306 may be rotated up to 90 degrees by mirror actuator 328. One or more mirror end-stops 326 may be placed to prevent the mirror from rotating further than 90 degrees.

The mirror may include an optional mirror magnet 330. In such a case, the mirror end-stops 326 may be constructed of ferromagnetic material or include a magnet in their structure. When the mirror 306 hits the end-stop 326, the magnet will pull the mirror flush with the end-stop and prevent it from unintentionally rotating away from the end-stop.

Mirror actuator 328 may be any type of electronic mechanical actuator such as a motor, solenoid, electromagnetic or other means of providing rotational force such that the mirror 306 may be rotated within its rotational limits defined by the end-stops 326. As noted in Embodiment A, many other types of actuator are possible and may be selected.

Operation—FIGS. 1, 2, 3A, 3C, 3H, 3J, 4, 4A, 4B—Embodiment B2

The operation of embodiment B2 is very similar to that of embodiment A. FIG. 4A shows an overview diagram of the system's data flow, which is the same as in embodiment A.

FIG. 4B is a flowchart showing the operating process for the peephole viewer camera apparatus 108 described in this embodiment. It is largely the same as in embodiment A, with the following key differences.

1) In step 426, in which the device enters idle state, the mirror actuator 328 rotates the mirror 306 into a configuration represented by FIG. 3H.
2) In step 434, the mirror actuator 328 rotates the mirror 306 into a configuration represented by FIG. 3J.
3) In step 452, the mirror actuator 328 rotates the mirror 306 into a configuration represented by FIG. 3H.

DETAILED DESCRIPTION—FIGS. 7, 8, 9—EMBODIMENT C

Figure 7:
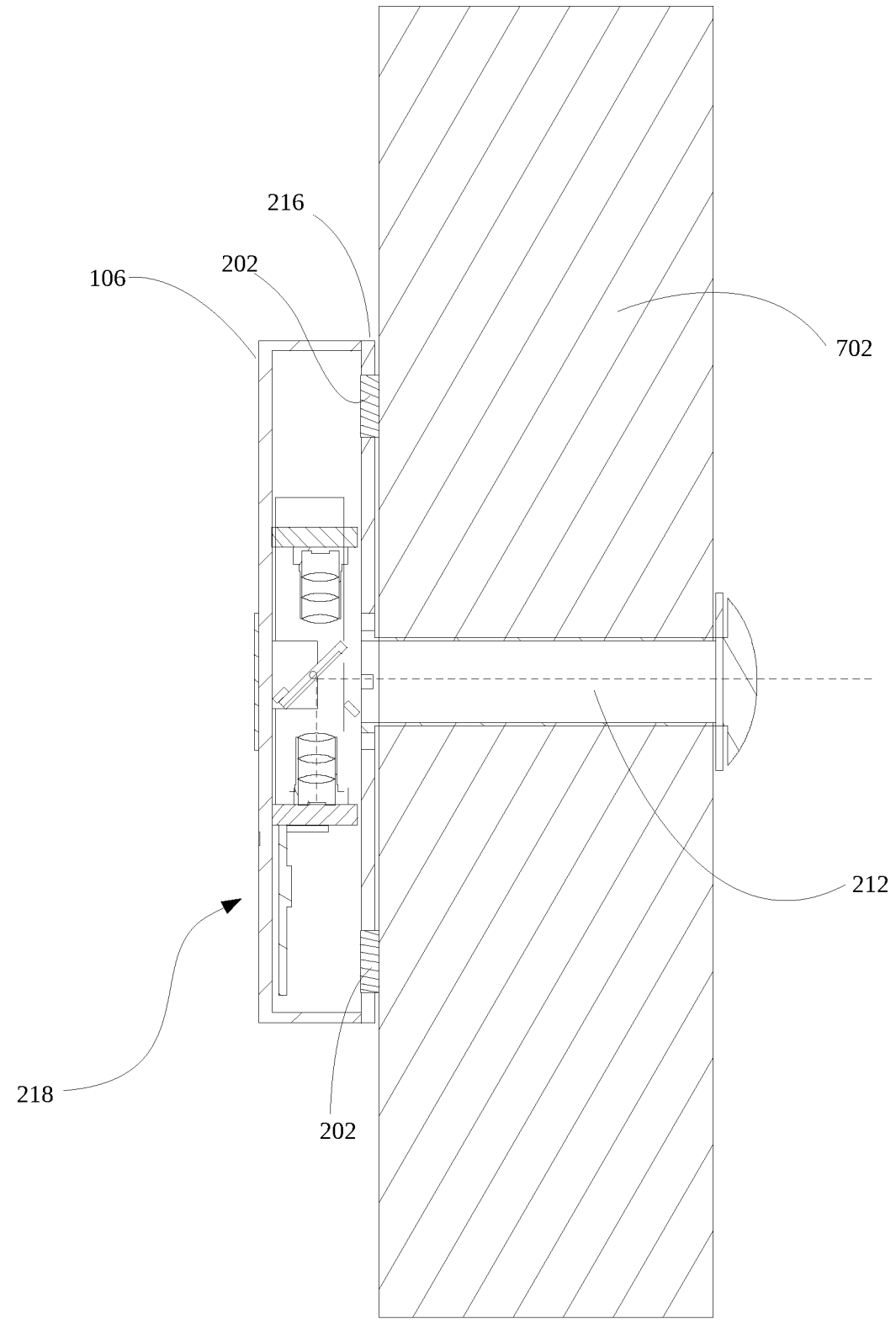

FIG. 7 shows an overview of embodiment C. In this embodiment, removable camera apparatus assembly 218 is mounted on steel door 702. No door mounting bracket is necessary, as magnets 202 firmly attaches assembly 218 to the steel door 702. Display 102 and front proximity sensor 104 are on the front face of camera apparatus front housing 106, but both are optional features.

Figure 8:
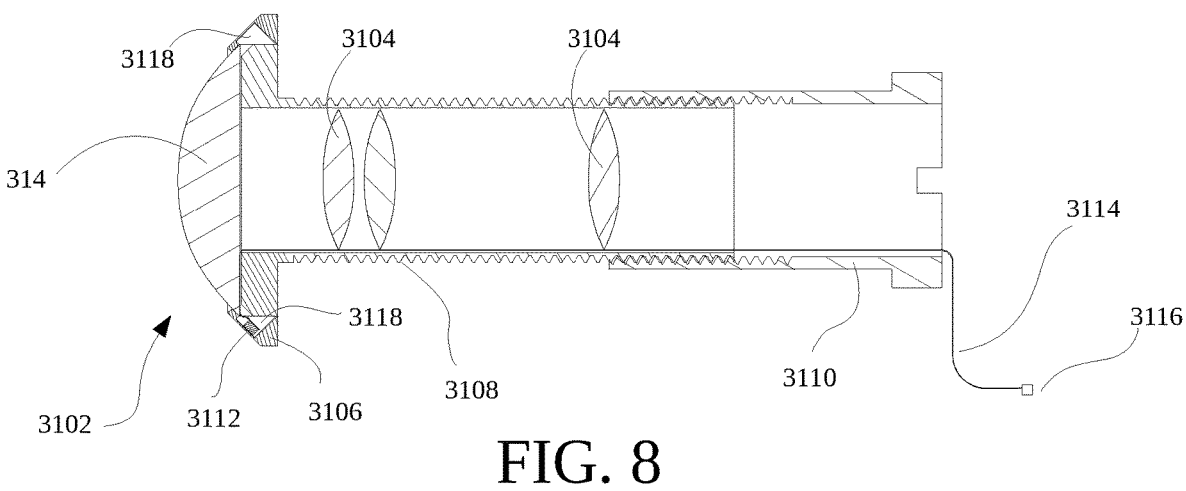

FIG. 8 shows an exploded view of removable camera apparatus assembly 218 in this embodiment. It includes camera apparatus front housing 106, which is rigidly attached to housing lid 216. Housing lid 216 has a housing lid viewing aperture 402, which is centered on door peephole viewer 212. A housing alignment magnet 202 is placed in each corner of the lid 216. Display 102 and front proximity sensor 104 are shown on the front face of housing 106.

Figure 9:
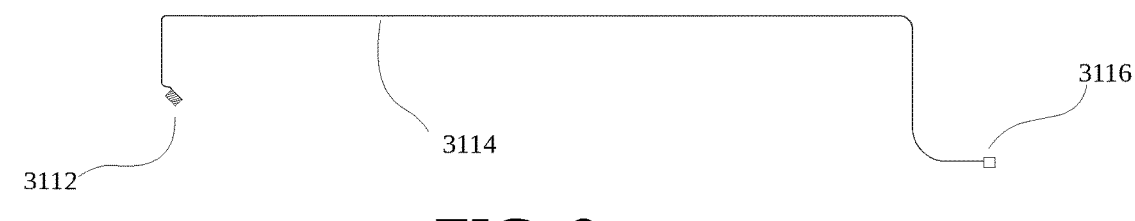
Figure 10:
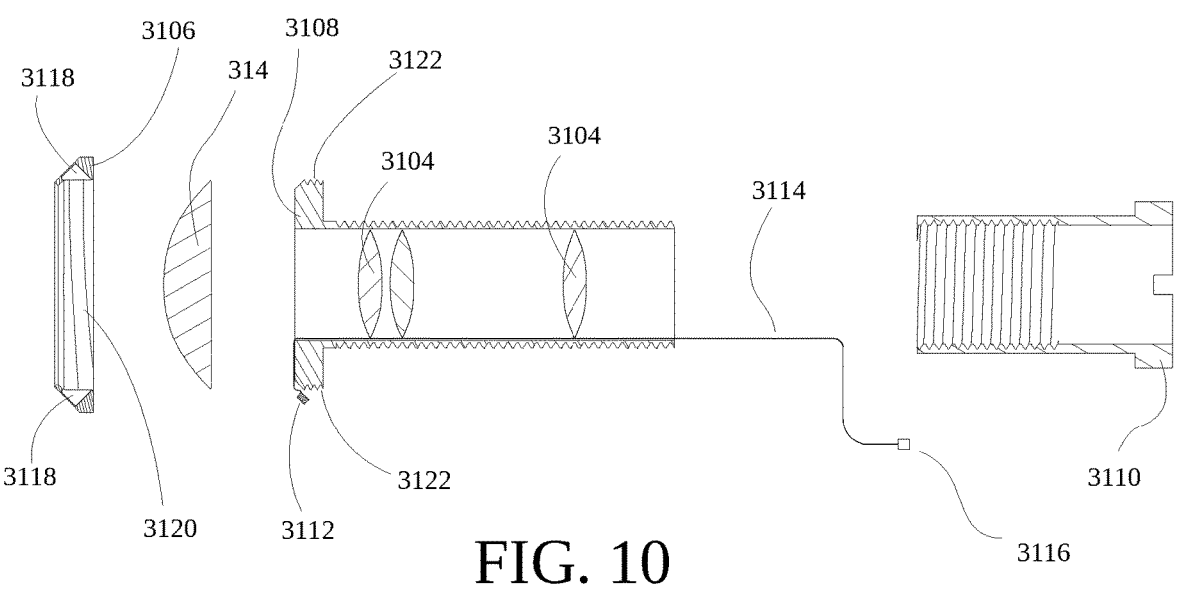
Figure 11:
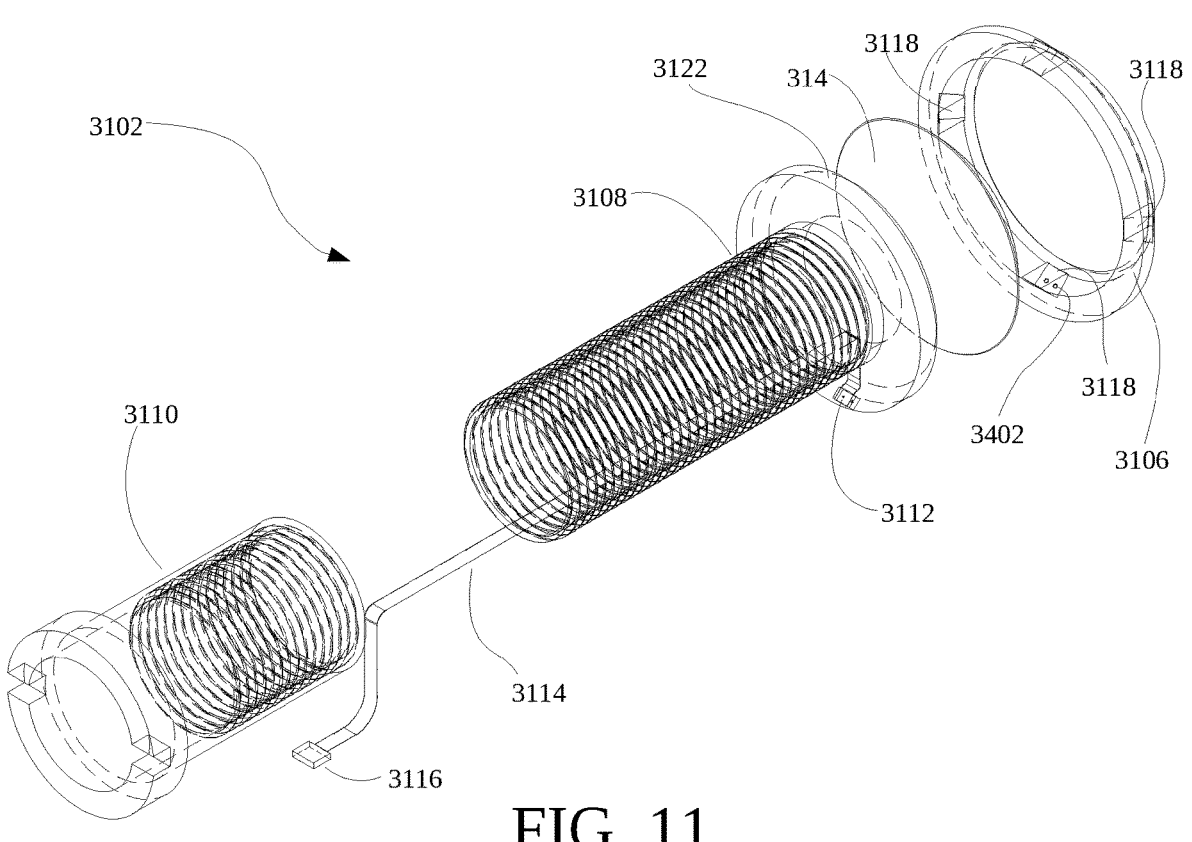
Figure 12:
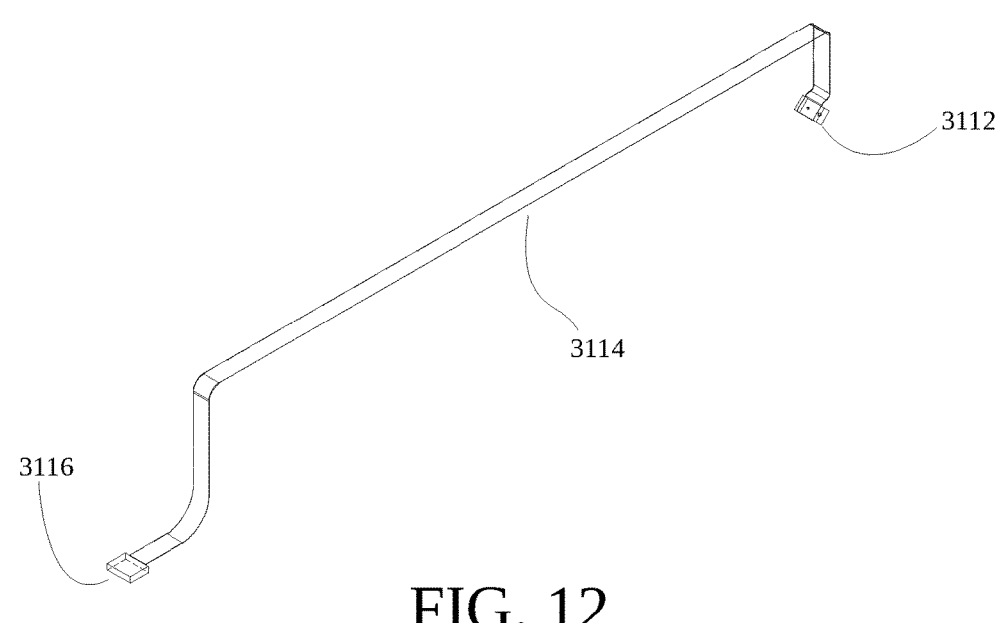
Figure 13:
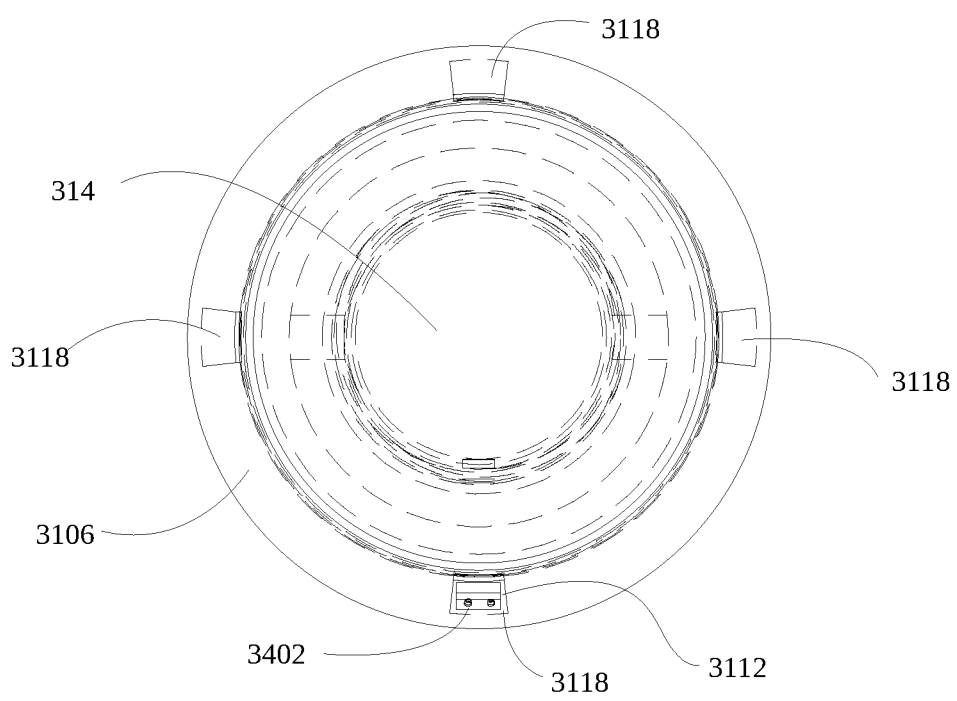
Figure 14:
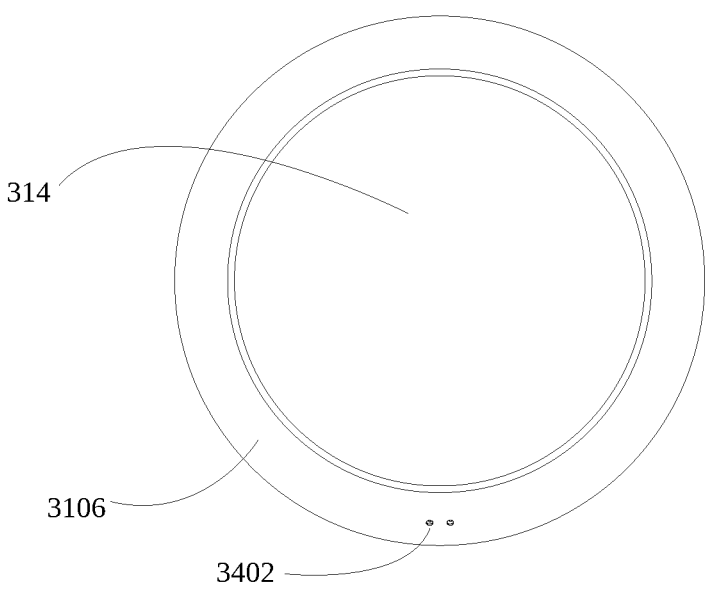
Figure 15:
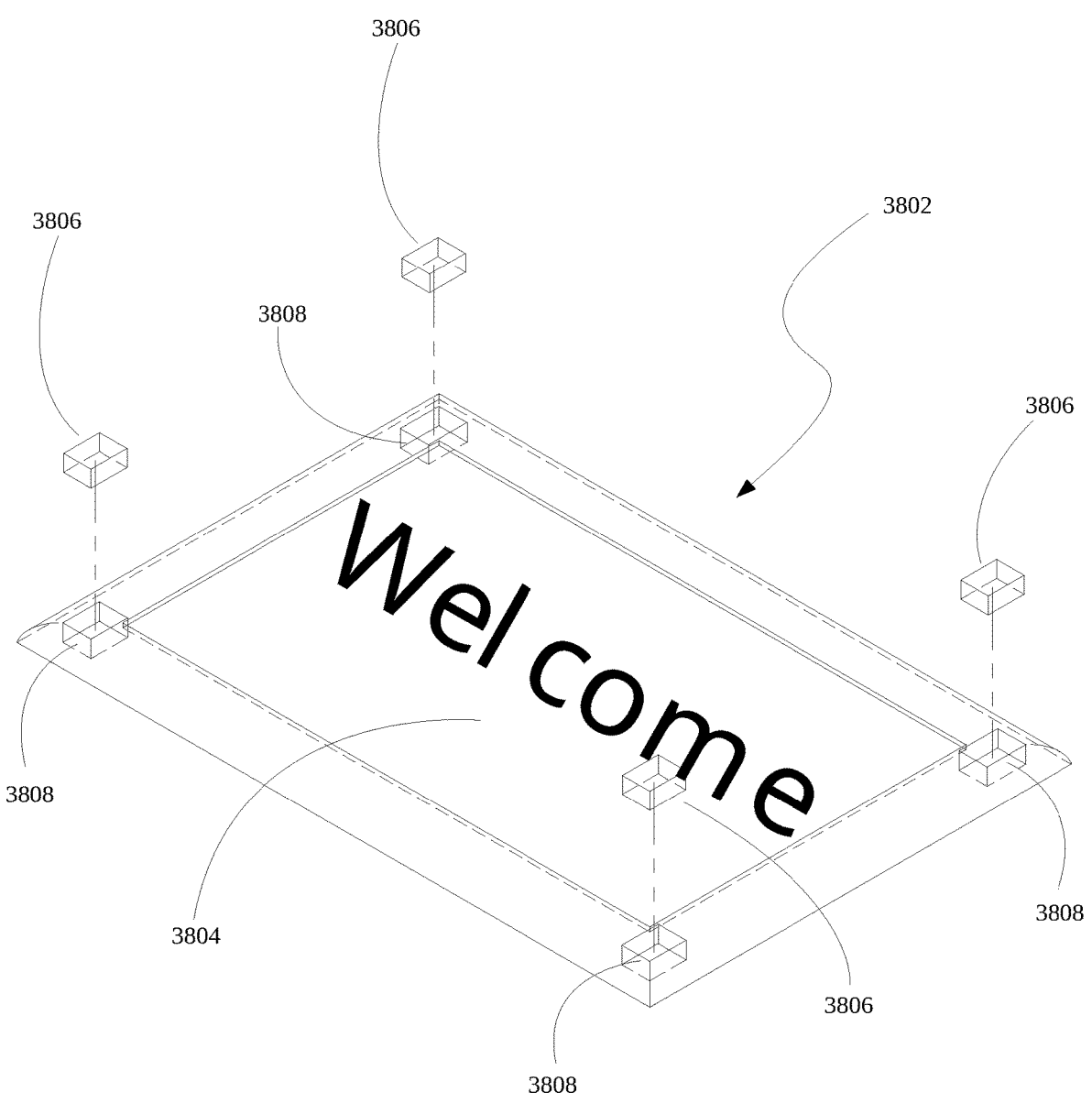
Figure 16:
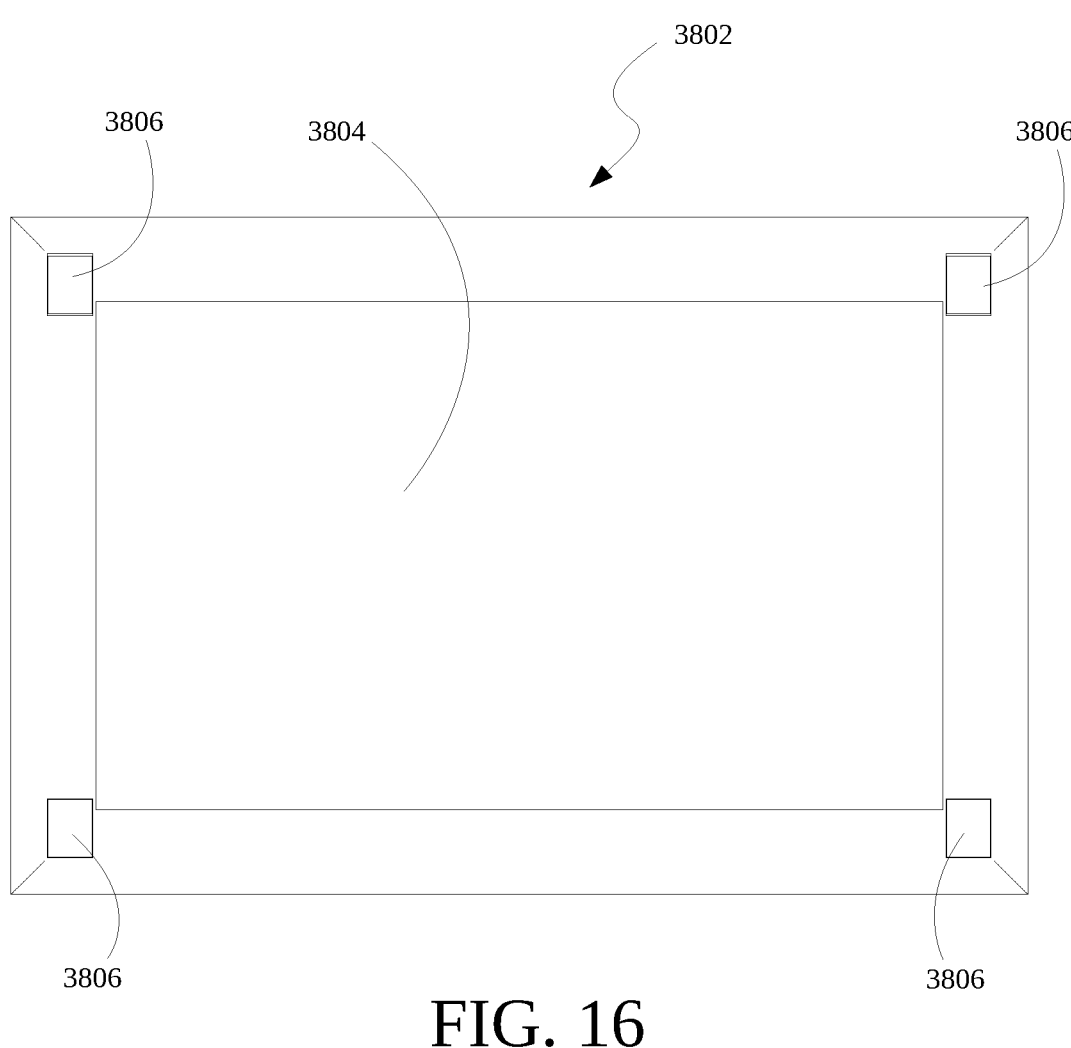
Figure 17:
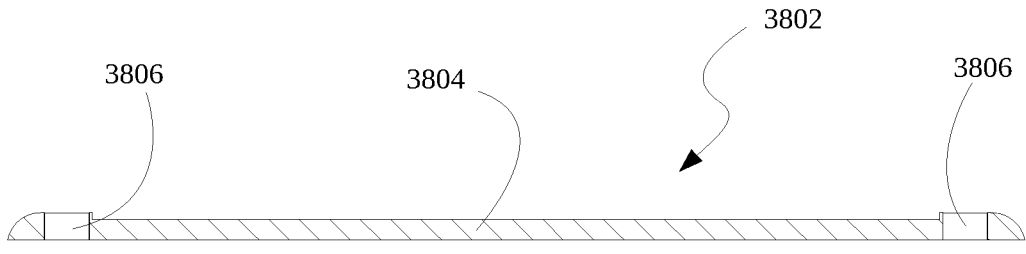
Figure 18:
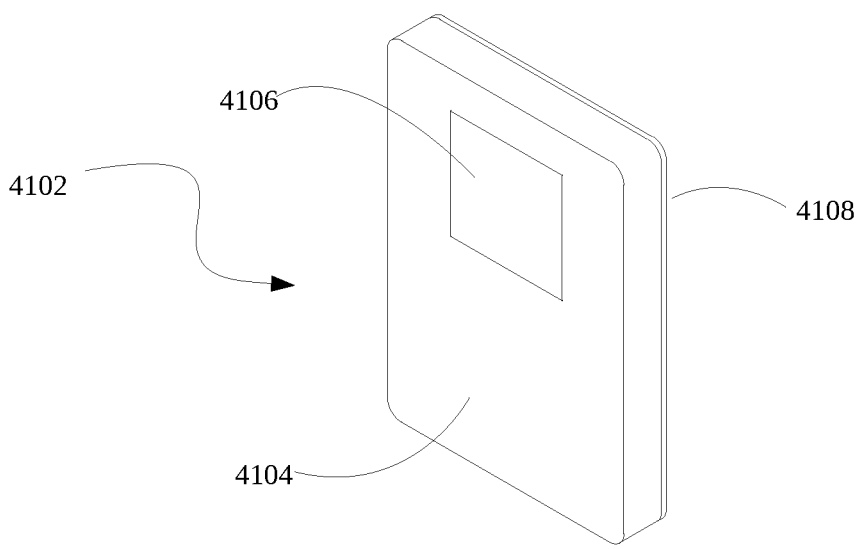
Figure 19:
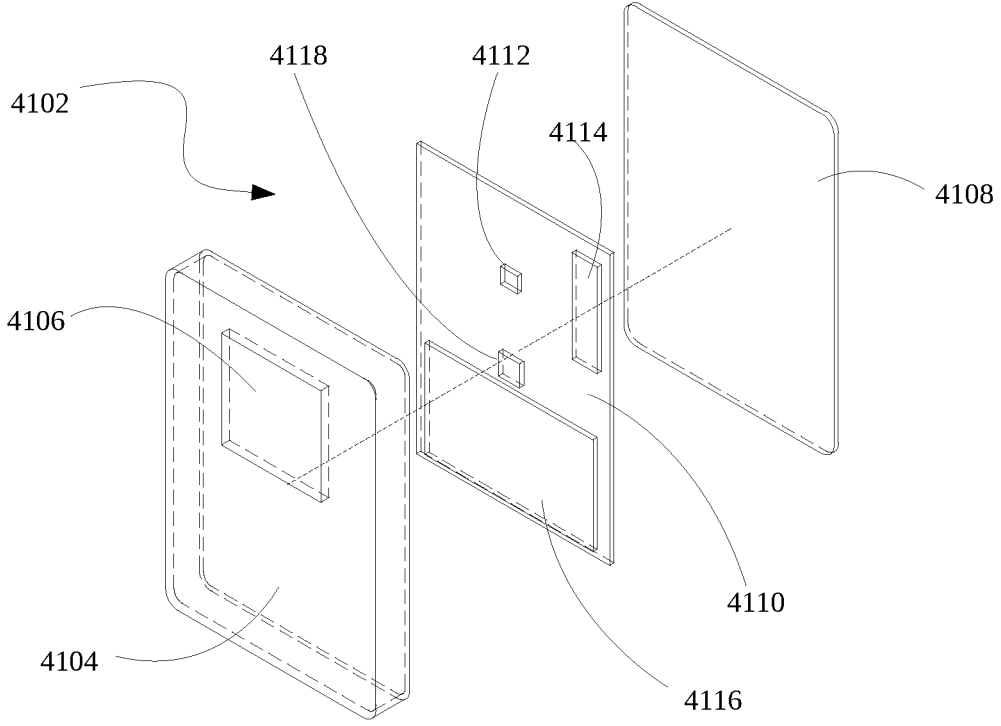
Figure 20:
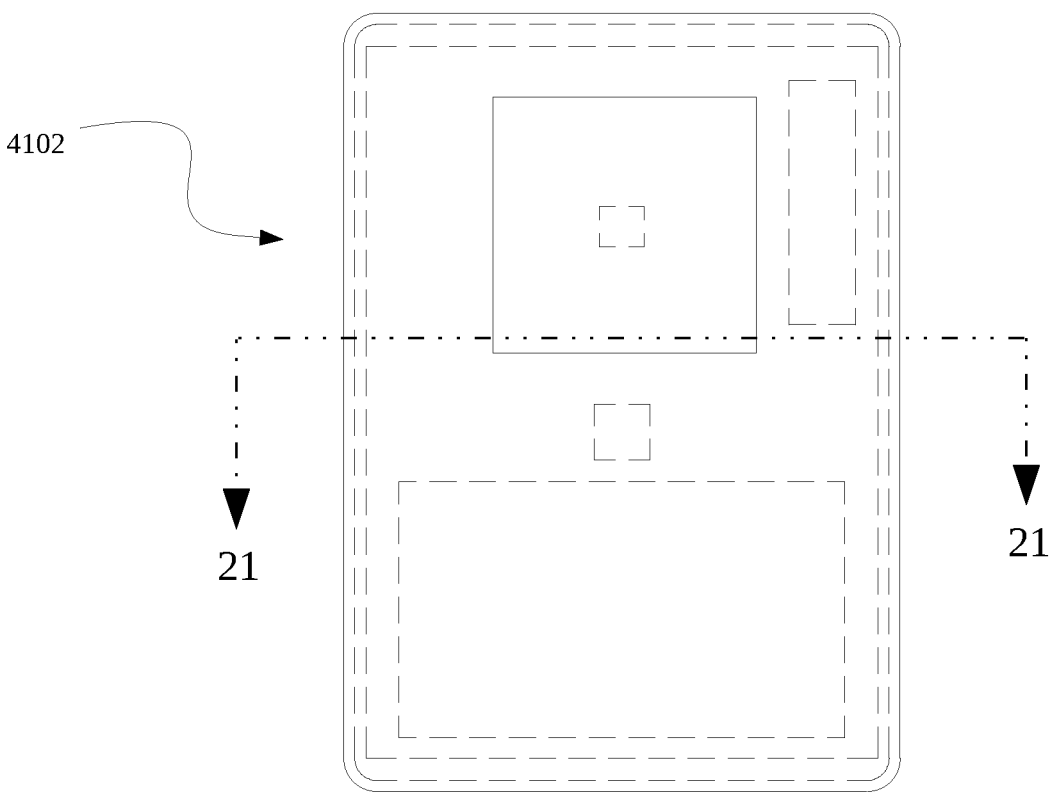
Figure 21:
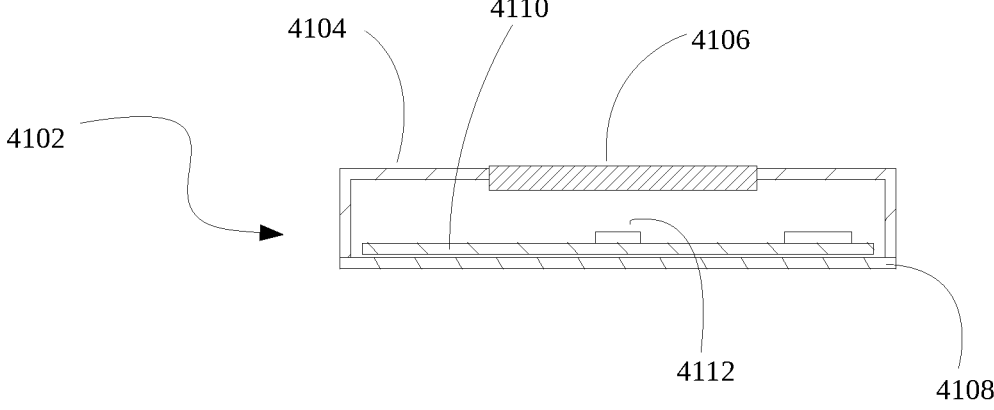
Figure 22:
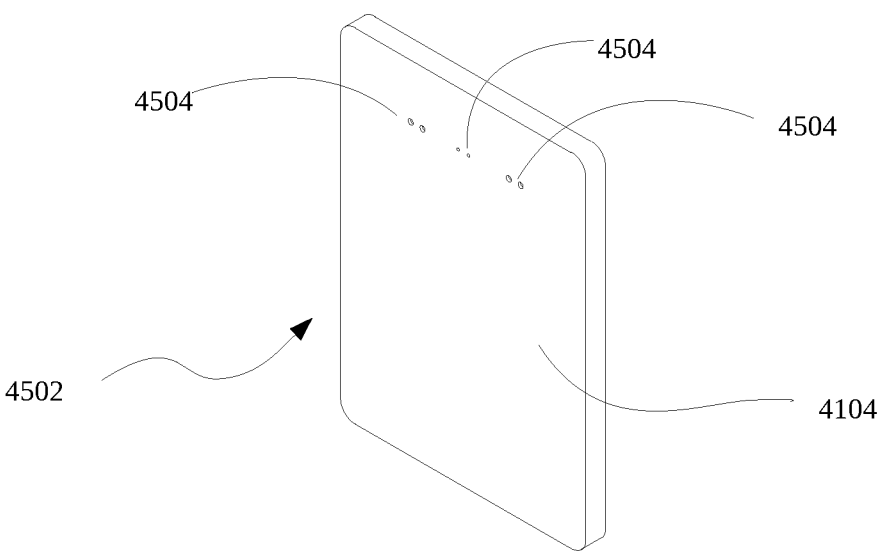
Figure 23:
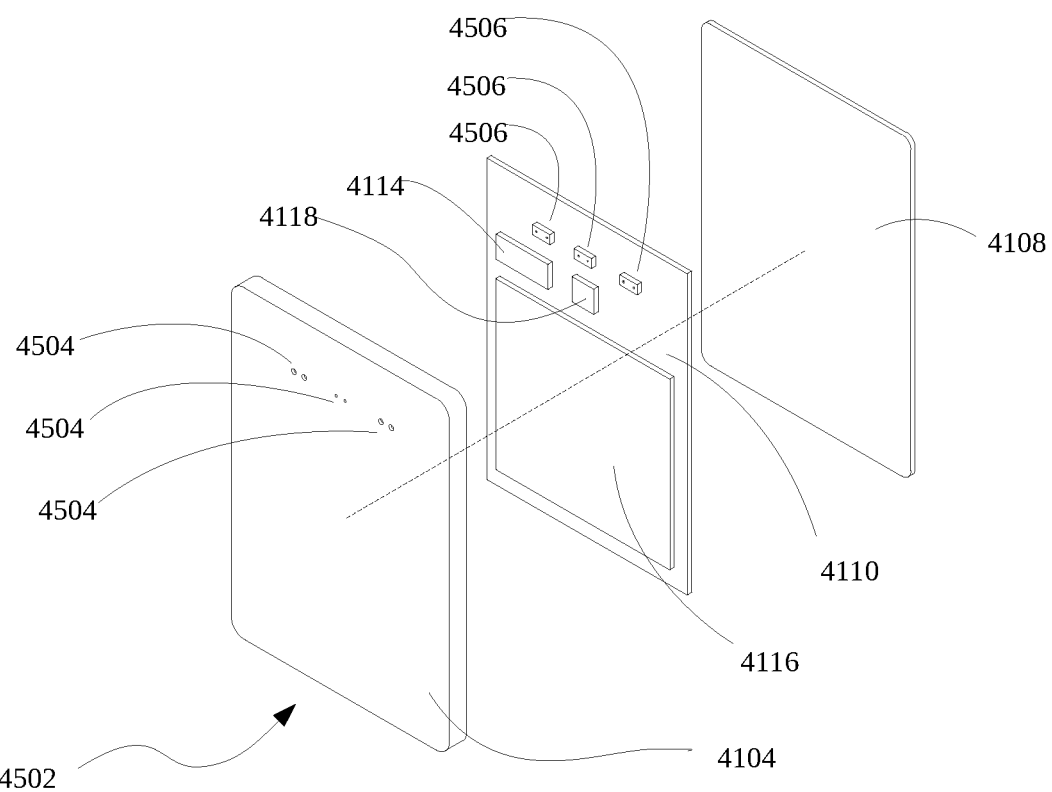
Figure 24:
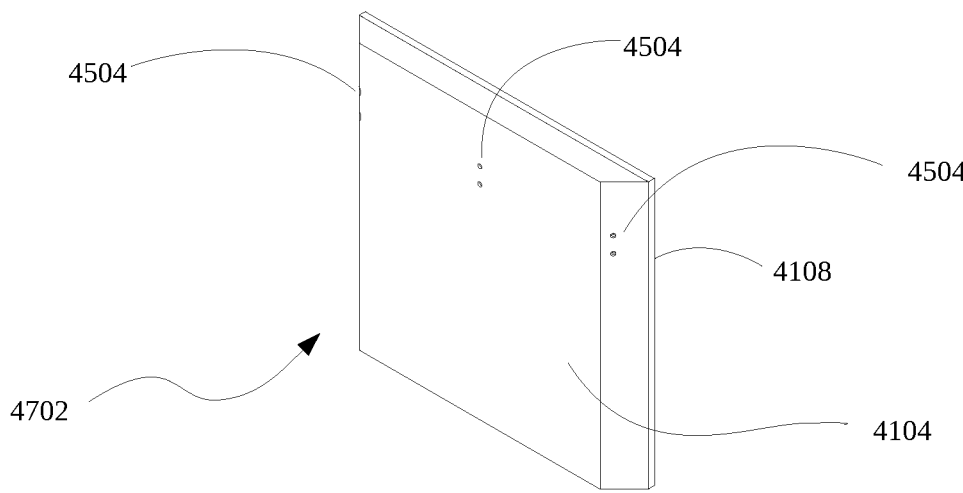
Figure 25:
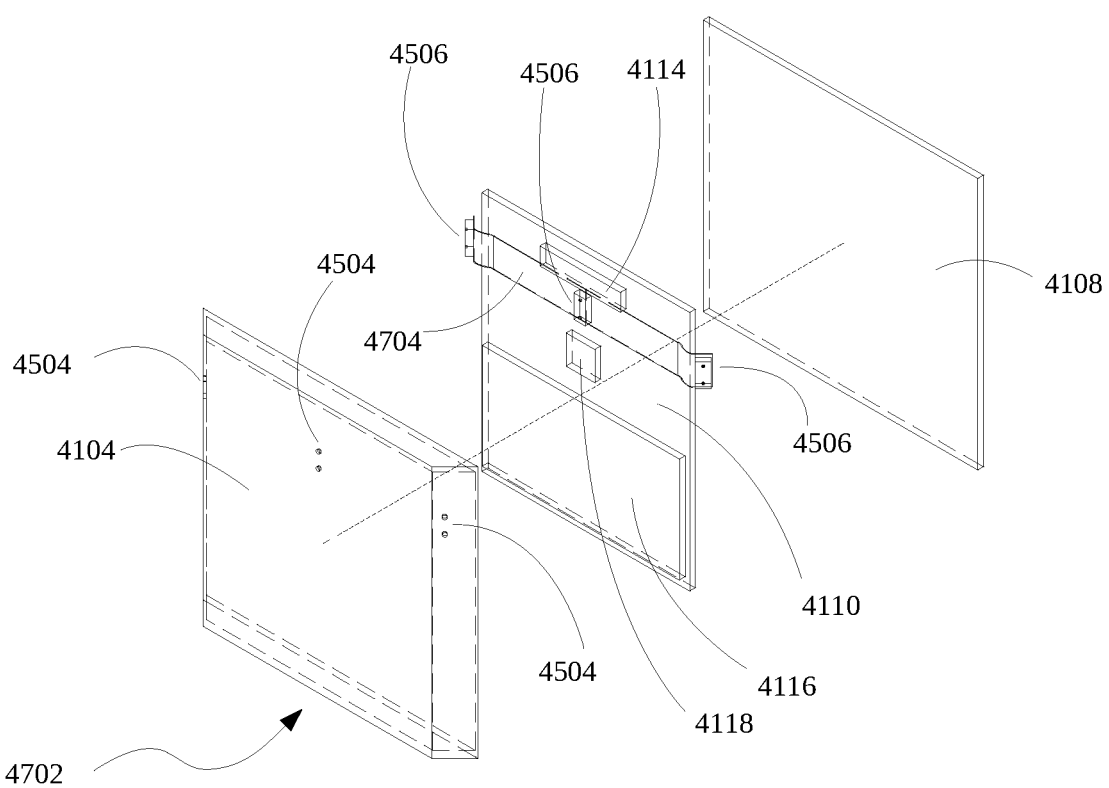
Figure 26:
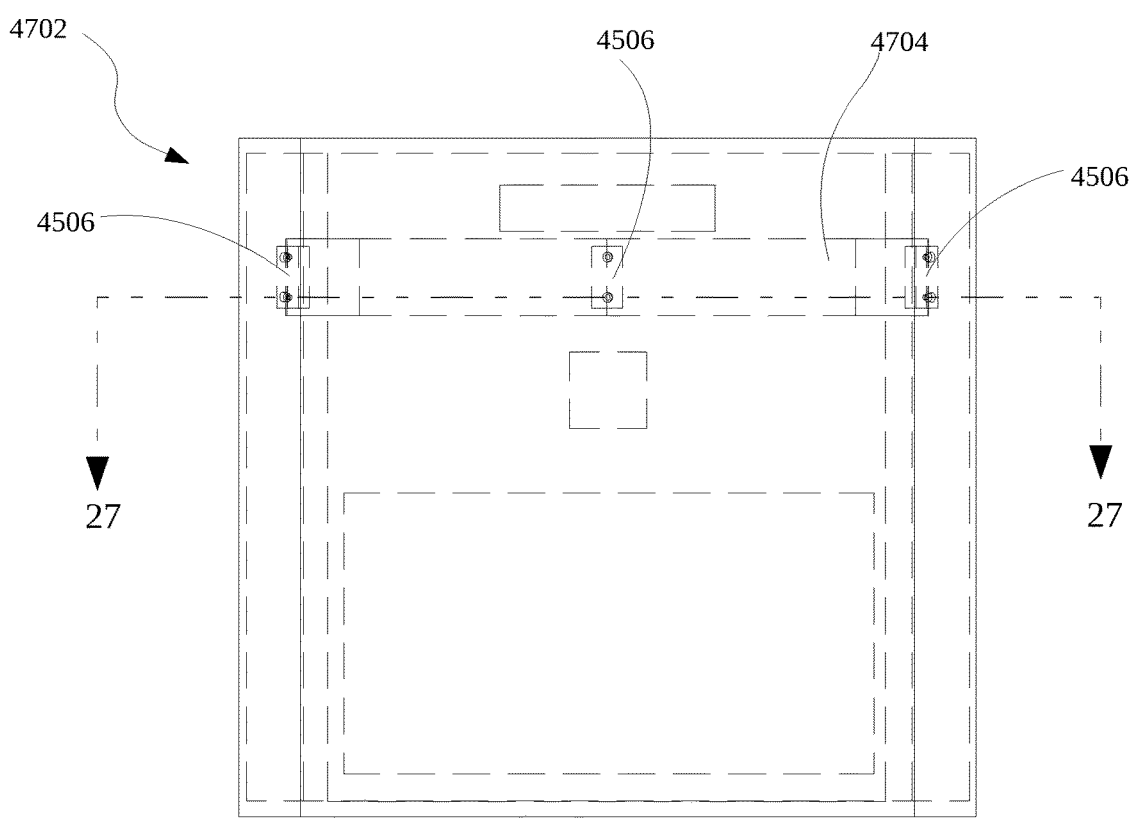
Figure 27:
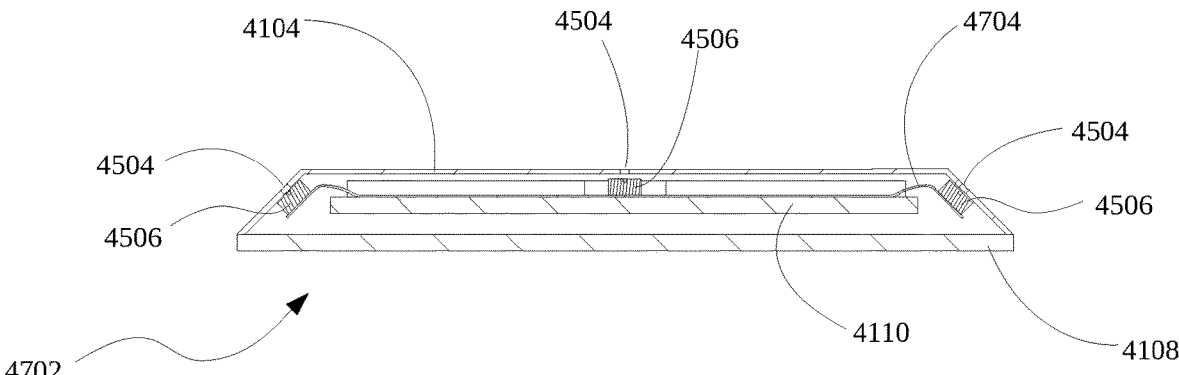
Figure 28:
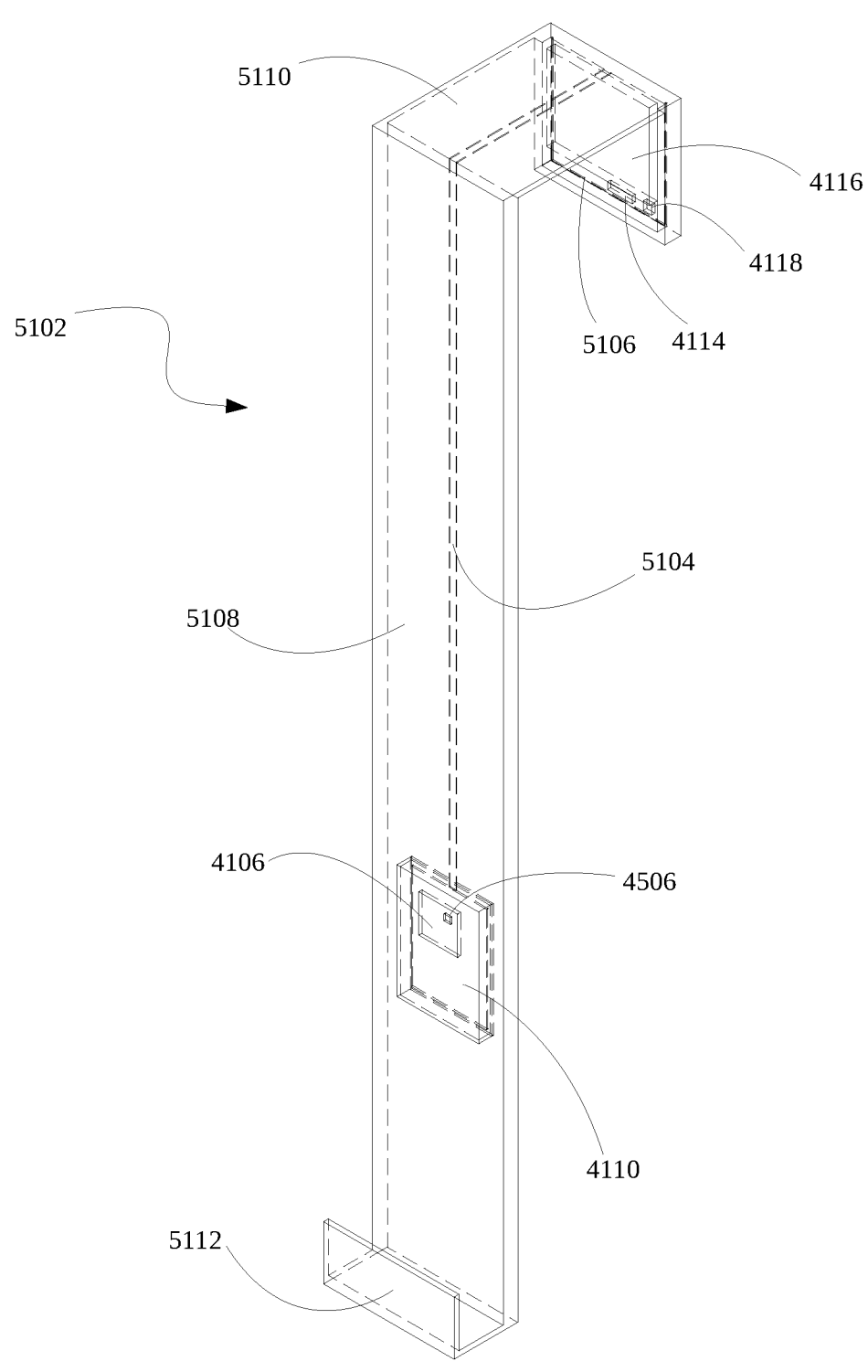
Figure 29:
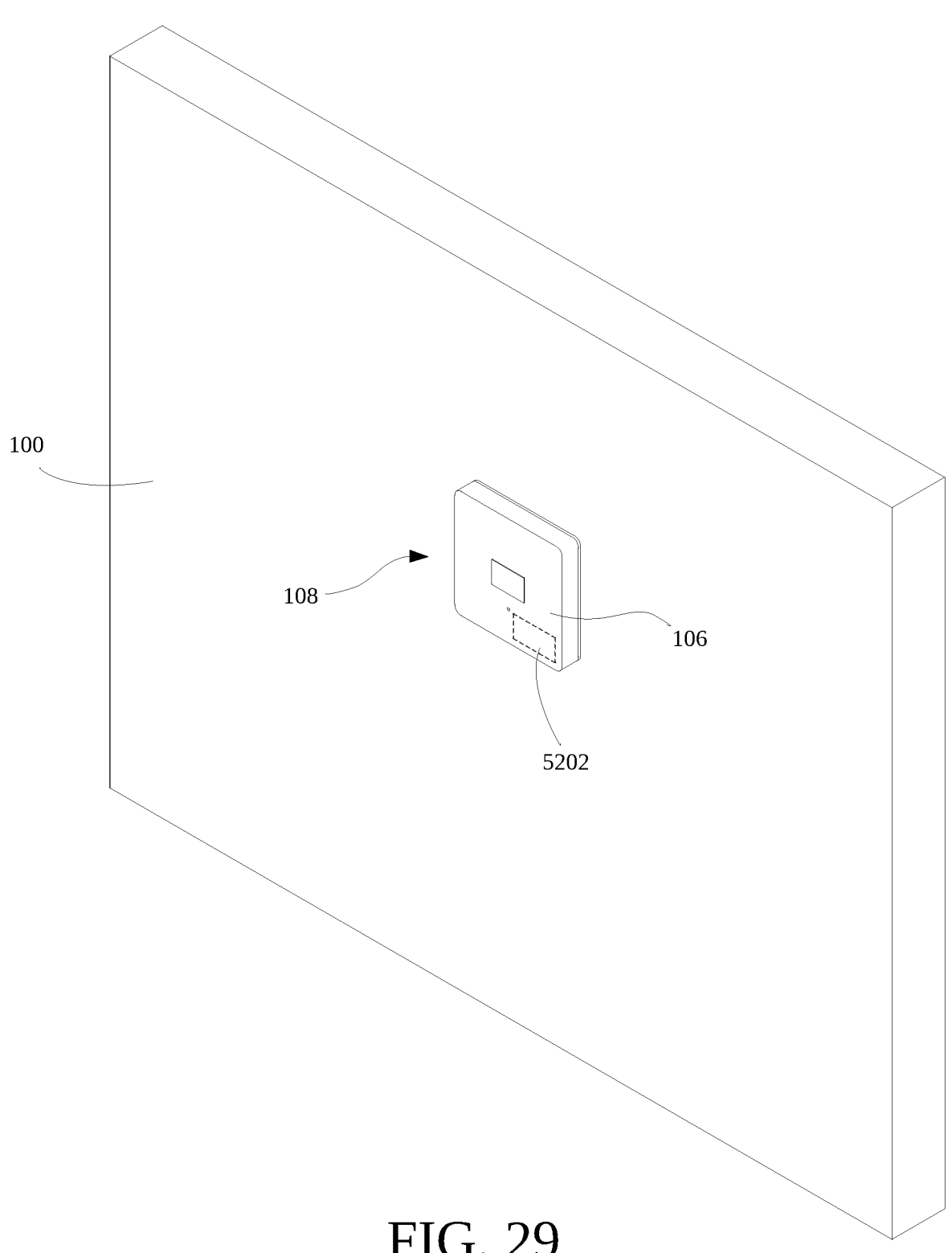

FIG. 9 is a side cross-section view of removable camera apparatus assembly 218 installed on the steel door 702. Housing 106 is rigidly attached to housing lid 216, which has embedded magnets 202. The magnets hold the assembly 218 firmly against the steel door 702 such that the assembly 218 is centered on door peephole viewer 212.

Operation—FIGS. 7, 8, 9—Embodiment C

The operation of this embodiment is very similar to embodiment A. One difference is that this embodiment lacks a door bracket. The housing lid 216 has magnets 202 which come directly in contact with the door. Removable camera apparatus assembly 218 be easily removed from the steel door 702 by pulling it away from the door to disengage the magnets 202.

For added support, the support ring 406 from embodiment A1 may be added. In addition, removable adhesive tape may be added to the back of housing lid 216 to provide more stability when mounted on the door.

The user may quickly and easily remove the entire apparatus 108 from the steel door 702 with very little effort.

DETAILED DESCRIPTION—FIGS. 31, 32, 33, 34, 35, 36, 37—EMBODIMENT J

This embodiment describes a peephole viewer apparatus with integrated sensors. This apparatus is similar to the wide-angle optical door viewer apparatus described in U.S. Pat. No. 4,269,474. However, the embodiment described herein adds an integrated proximity sensor.

FIG. 31 shows a side cross-section view of peephole viewer apparatus with integrated sensors 3102. Peephole front housing tube 3108 is threaded such that it can be screwed into rear housing tube 3110, which is also threaded. Front housing tube 3108 includes one or more peephole lens elements 3104. Primary lens 314 is aligned with the optical axis of lenses 3104. This optical axis is also aligned with housing tube 3108 and 3110. Peephole front flange ring 3106 is threaded, and fits over primary lens 314. Front flange ring 3106 has one or more flange ring sensor recesses 3118. Sensor 3112 is placed inside of sensor recess 3118. Sensor 3112 is connected to sensor FFC 3114 (flat flexible cable), which is terminated by FFC connector 3116.

In this embodiment, the sensor 3112 is a time-of-flight (ToF) sensor, which can report proximity of an object. It requires only two small apertures to emit and collect infrared light. An example sensor is about three millimeters in length, and two millimeters wide. The required sensor apertures may be as small as one millimeter in diameter.

Note that the sensor may be of any variety including but not limited to time-of-flight, passive infrared, image or camera-based, microphone, LIDAR, ultrasonic, or other type of proximity sensor.

FIG. 32 shows a side cross-section view of the sensor 3112, sensor FFC 3114, and FFC connector 3116.

FIG. 33 shows a side cross-section exploded view of the peephole viewer apparatus 3102. This view shows the same labeled components as FIG. 31. It also shows flange ring threads 3120, and flange receiving threads 3122. These threads allow the front flange ring 3106 to be screwed onto the front housing tube 3108.

FIG. 34 shows an isometric exploded view of the peephole viewer apparatus with integrated sensors 3102. This view shows the same labeled components as FIG. 31. and FIG. 33. It shows a clearer view of the recess 3118, which has flange ring sensor apertures 3402 to allow the sensor to see or hear through the flange ring 3106.

FIG. 35 shows an isometric view of the sensor 3112, sensor FFC 3114, and FFC connector 3116.

FIG. 36 shows a front view of the peephole viewer apparatus 3102. Front flange ring 3106 has one or more flange ring sensor recesses 3118. Sensor 3112 is placed inside of sensor recess 3118, which has flange ring sensor apertures 3402 to allow the sensor to see or hear through the flange ring 3106.

FIG. 37 shows a front view of the peephole viewer apparatus 3102. This is the same view as FIG. 36, but it is an opaque view to show front surface details. Front flange ring 3106 holds primary lens 314 in place. Flange ring sensor apertures 3402 allow sound or light to pass through flange ring 3106 to reach the sensor 3112 inside.

Note that although the figures show four sensor recesses 3118, there may be more or fewer in a practical implementation, depending on need. The sensor recesses 3118 may be placed anywhere around the flange ring 3106. Also note that only one sensor 3112 is shown in the figures. More sensors may be added to make use of any sensor recesses 3118 available.

Operation—FIGS. 31, 32, 33, 34, 35, 36, 37—Embodiment J

The peephole viewer apparatus with integrated sensors 3102 is meant to be installed on a door, such that the person on the indoor side of the door may look through the peephole viewer and see what is on the other side of the door. The peephole viewer's lenses are arranged such that the viewer provides a wide-angle field of view through the door.

The peephole viewer apparatus 3102 described in this embodiment includes one or more integrated sensors 3112 which are placed within the flange ring 3106. When installed on the door, this flange ring 3106 is on the outside surface of the door. Thus any sensors 3112 in the flange ring 3106 can see or hear through flange ring sensor apertures 3402 to the space on the outdoors side of the door. Each sensor 3112 has a sensor FFC 3114, which passes data and power through the housing tubes 3108 and 3110. This allows the sensor to connect to a host microcontroller or CPU on the indoors side of the door. Such a microcontroller or CPU may then access the sensor 3112 data. If the sensor 3112 is a proximity sensor, the CPU or microcontroller may process the proximity data and determine whether there is activity on the other side of the door.

Such a CPU or microcontroller is described in a previous embodiment A. In FIG. 4A, CPU 414 connects via sensor communication network 422 to an external sensor 424. Any integrated sensor 3112 in the current embodiment may be used as external sensor 424 in FIG. 4A of embodiment A.

DETAILED DESCRIPTION—FIGS. 41, 42, 43, 44—EMBODIMENT L

FIG. 41 shows an isometric view of wireless passive infrared sensor module 4102. Sensor module front housing 4104 has a lens 4106 on its surface, and rear housing 4108. Lens 4106 may be a Fresnel variety of lens, which is able to pass through light in the infrared range as required by a passive infrared sensor.

FIG. 42 shows an exploded isometric view of wireless passive infrared sensor module 4102. Sensor circuit board 4110 has a passive infrared sensor 4112, antenna 4114, battery 4116, and processor with rf transceiver 4118. The circuit board 4110 is held between front housing 4104 and rear housing 4108. Housing 4104 and 4108 are rigidly attached together, for example, by mechanical means or ultrasonic welding. Front housing 4104 has lens 4106 positioned over passive infrared sensor 4112. An example Fresnel lens which is 2 cm by 3 cm in width and height is placed 8 millimeters above sensor 4112 for the best performance in infrared light collection.

FIG. 43 shows a top view of sensor module 4102. FIG. 44 shows a side cross-section view of sensor module 4102.

Operation—FIGS. 41, 42, 43, 44—Embodiment L

Wireless passive infrared sensor module 4102 may be used to remotely detect proximity of a person or animal. Overall, the module 4102 may be very small. In one design, the nominal size of module 4102 is 4 cm wide, 3 cm long, and 8 mm thick. This makes the module 4102 very inconspicuous, and easy to place anywhere in the area outside of the door for remote proximity detection. The bottom side of the module 4102 may be backed with adhesive tape to mount on the door frame, the door, or a wall.

The lens 4106 focuses infrared light from a very wide field of view onto passive infrared sensor 4112. The processor with rf transceiver 4118 on the circuit board 4110 processes the sensor 4112 output and determines whether a person is present. When a person is determined to be present, the processor 4118 transmits a message using antenna 4114 indicating that activity is detected.

Battery 4116 provides power to the circuit board and all components. This type of system requires very little power, and can generally run for up to ten years on a single CR2032 lithium coin cell battery (see https://www.ti.com/tool/TIDA-01398)

The processor with rf transceiver 4118 may use any low power radio frequency protocol to transmit the "activity present" message. Some examples are Bluetooth, Zigbee, ANT, or other proprietary radio frequency communication protocols. Alternatively, a different type of transceiver could be used, replacing radio frequency transmission. Other types of transceivers could be used including infrared, sound, or other types of light-based communication. Alternatively, a wired method of communication could be used such as RS485, UART, Ethernet, I2C, or SPI.

Sensor module 4102 may thereby act as external sensor 424 in FIG. 4A of embodiment A. In FIG. 4A, CPU 414 connects via sensor communication network 422 to an external sensor 424.

DETAILED DESCRIPTION—FIGS. 38, 39, 40—EMBODIMENT K

FIG. 38 shows an exploded isometric view of welcome mat with integrated sensors 3802. Mat 3804 is a typical rectangular piece of material, such as one might place in front of one's entry door to a home. Around the border edge of mat 3804 are a number of sensor module recesses 3808. Within each recess 3808 is a sensor module 3806. This sensor module 3806 may be, for instance, a wireless passive infrared sensor module as described in embodiment L. As shown in FIG. 42, the wireless passive infrared sensor module 4102 has a lens 4106, which in this case is a Fresnel lens. In general, Fresnel lenses designed for passive infrared usage are either translucent white material, or black, with a smooth or matte texture. The border around the mat 3804 may be composed of a similar material to match the appearance of the Fresnel lens. This makes it blend in with the appearance of mat 3804 such that a person looking at the mat will not notice it.

FIG. 39 shows a top view of welcome mat 3802. A sensor module 3806 is found in each corner of the mat 3804. FIG. 40 shows a side view of the welcome mat 3802.

In this embodiment, the sensor modules 3806 preferably use passive infrared such as the wireless passive infrared sensor module 4102 in embodiment L. Alternatively, other types of sensors could be used.

Note that four sensor modules 3808 are shown, but there may be more or as few as one sensor module 3808. The modules 3808 are shown in the corners of mat 3804, but they may be located anywhere on the mat.

An alternative in this welcome mat embodiment is using the same concept in the form of a welcome sign. Instead of placing it on the floor, it may be hung on the door. In this case, the sensor modules 3808 may be placed anywhere on the surface of the sign. One or more sensor modules 3808 may be placed under the background of the sign, or under the text. This is optimal if a large, thick black font is used. In this case, a black Fresnel lens may be used inside of one or more of the letters in the welcome message on the sign. The black material used for the letters can be chosen to match the Fresnel lens such that the lens is not noticeable.

Any number of ornamental designs may be used for this type of sign, and the same for the welcome mat.

Operation—FIGS. 38, 39, 40—Embodiment K

The user places the welcome mat 3802 outside of the entry door, such as on a porch or main doorway to an apartment, condo, or house. Once in place, the sensor modules 3808 may monitor the area in front of the doorway or porch.

Preferably, sensor modules 3808 are implemented as the wireless passive infrared sensor module 4102 in embodiment L. In this case, each sensor module 3808 may thereby act as external sensor 424 in FIG. 4A of embodiment A. In FIG. 4A, CPU 414 connects via sensor communication network 422 to an external sensor 424.

As few as one sensor module 3808 may be used in mat 3802. The welcome mat is intended to be stepped upon, and people may wipe their dirty shoes on it upon entering the home. Adding more sensors may be beneficial, in case one or more of the sensor module 3808 on the mat 3802 becomes occluded by dirt or grime from shoes as they tread upon the mat 3802.

Note that although the sensor module 4102 is described as similar to embodiment L, any type of proximity sensor module could be used. Another example of a proximity sensor is in embodiment M and embodiment N.

DETAILED DESCRIPTION—FIGS. 45,46—EMBODIMENT M

FIG. 45 an isometric view of wireless proximity sensor module 4502. Sensor module front housing 4104 has a plurality of proximity sensor housing apertures 4504 on its surface.

FIG. 46 is an exploded isometric view of wireless proximity sensor module 4502. Sensor module front housing 4104 is shown with a plurality of proximity sensor housing apertures 4504 on its surface. Sensor circuit board 4110 has a one or more proximity sensors 4506, antenna 4114, battery 4116, and processor with rf transceiver 4118. The circuit board 4110 is held between front housing 4104 and rear housing 4108. Housing 4104 and 4108 are rigidly attached together, for example, by mechanical means or ultrasonic welding.

Note that the sensors 4506 may be of any variety including but not limited to time-of-flight, passive infrared, image or camera-based, microphone, LIDAR, ultrasonic, or other type of proximity sensor.

Operation—FIGS. 45,46—Embodiment M

This embodiment is similar to embodiment L, but instead of using passive infrared sensors it uses active proximity sensors. In this embodiment, the wireless proximity sensor module 4502 uses one or more proximity sensors 4506. These proximity sensors are preferably time-of-flight sensors, which can report proximity of an object. In this case, each sensor 4506 requires only two small apertures 4504 to emit and collect infrared light. An example sensor is about three millimeters in length, and two millimeters wide. The required sensor apertures may be as small as one millimeter in diameter.

In general, a time-of-flight sensor has a field of view of about thirty degrees. Thus, multiple sensors may be added with overlapping fields of view to cover a larger, virtual field of view.

Wireless proximity sensor module 4502 may be used to remotely detect proximity of a person. The processor with rf transceiver 4118 on the circuit board 4110 processes the proximity sensors 4506 outputs and determines whether a person is present. When a person is determined to be present, the processor 4118 transmits a message using antenna 4114 indicating that activity is detected.

Battery 4116 provides power to the circuit board and all components. An external port may be added to recharge the battery 4116.

The processor with rf transceiver 4118 may use any low power radio frequency protocol to transmit the "activity present" message. Some examples are Bluetooth, Zigbee, ANT, or other proprietary radio frequency communication protocols. Alternatively, a different type of transceiver could be used, replacing radio frequency transmission. Other types of transceivers could be used including infrared, sound, or other types of light-based communication. Alternatively, a wired method of communication could be used such as RS485, UART, Ethernet, I2C, or SPI.

In this embodiment, the "activity present" message may include extra information such as estimated proximity distance.

Wireless proximity sensor module 4502 may thereby act as external sensor 424 in FIG. 4A of embodiment A. In FIG. 4A, CPU 414 connects via sensor communication network 422 to an external sensor 424. In this type of a setup, the user would mount the sensor somewhere on the outside area of the doorway. For instance, the user could use adhesive tape to attach the module 4502 to the door frame, wall, or outside surface of the door.

Sensors 4506 are preferably time-of-flight sensors, which are extremely small. Therefore, the sensor module 4502 can be made very thin and low profile. It is possible to make the module less than a few millimeters in thickness. In addition, the top surface of the module 4502 may be customized with any type of material or finish. Thus, it can be customized to match the surface on which it is mounted. This makes the module 4502 difficult to notice by an observer.

In one design, the nominal size of module 4502 is 4 cm wide, 3 cm long, and 3 mm thick. This makes the module 4102 very inconspicuous, and easy to place anywhere in the area outside of the door for remote proximity detection. Module 4502 may be backed with adhesive tape for easy mounting on the door, door frame, wall, or any surface in the area outside of the door.

CONCLUSIONS, RAMIFICATIONS AND SCOPE

The above description of illustrated implementations, including what is described in the Abstract, is not intended to be exhaustive or to limit the scope of the disclosure to the precise forms disclosed. While specific implementations of, and examples for, the embodiments disclosed herein are described herein for illustrative purposes, various equivalent modifications are possible within the scope of the disclosure, as those skilled in the relevant art will recognize.

The invention claimed is:

1. Apparatus for monitoring activity on the outdoors-facing side of a door through the door's integrated peephole viewer, mounted on the indoors-facing side of the door, comprising:

a) A main housing which is removable from the door, has physical alignment features and magnets, additionally comprising a door bracket with physical alignment features and magnets, which is attached to the door by means of removable adhesive, configured to physically couple with the apparatus' removable main housing;

b) A primary camera module with one or more lenses;

c) A secondary camera module with one or more lenses;

d) A mirror which may be rotated by an actuator, which redirects the door peephole viewer's optical path such that either the primary or secondary camera module is selected to have a clear view through the door's peephole viewer;

e) A CPU and video processor configured to control the mirror actuator and collect and store image and video activity data as seen through the peephole viewer;

f) A communications module configured to transmit image, video, and activity data over a communication network to a local server or cloud server.

2. Apparatus for monitoring activity on the outdoors-facing side of a door through the door's integrated peephole viewer, mounted on the indoors-facing side of the door, comprising:

a) A main housing which is removable from the door, has physical alignment features and magnets, additionally comprising a door bracket with physical alignment features and magnets, which is attached to the door by means of removable adhesive, configured to physically couple with the apparatus' removable main housing;

b) A ring whose inner diameter matches the outer diameter of the door's peephole viewer, physically supporting the apparatus' main housing when mounted on the door, and allowing non-permanent mounting to the door;

c) A primary camera module with one or more lenses;

d) A secondary camera module with one or more lenses;

e) A mirror which may be rotated by an actuator, which redirects the door peephole viewer's optical path such that either the primary or secondary camera module is selected to have a clear view through the door's peephole viewer;

f) A CPU and video processor configured to control the mirror actuator and collect and store image and video activity data as seen through the peephole viewer;

g) A communications module configured to transmit image, video, and activity data over a communication network to a local server or cloud server.

3. Apparatus for monitoring activity on the outdoors-facing side of a door through the door's integrated peephole viewer, mounted on the indoors-facing side of the door, comprising a main housing with:

a) A primary camera module with one or more lenses;

b) A secondary camera module with one or more lenses;

c) A mirror which may be rotated by an actuator, which redirects the door peephole viewer's optical path such that either the primary or secondary camera module is selected to have a clear view through the door's peephole viewer;

d) A CPU and video processor configured to collect and store image and video activity data seen through the peephole viewer;

e) A communications module configured to transmit image, video, and activity data over a communication network to a local server or cloud server;

f) One or more external sensors connected via a sensor communication network such that at least one of the connected external sensors is a peephole viewer device comprising: front and rear threaded housing tubes for installation through the door; one or more lenses; front flange with integrated sensors configured to gather occupancy information about the outdoors-facing side of the door; and a cable for connection to the apparatus via the sensor communication network.

4. Apparatus for monitoring activity on the outdoors-facing side of a door through the door's integrated peephole viewer, mounted on the indoors-facing side of the door, comprising a main housing with:

a) A primary camera module with one or more lenses;

b) A secondary camera module with one or more lenses;

c) A mirror which may be rotated by an actuator, which redirects the door peephole viewer's optical path such that either the primary or secondary camera module is selected to have a clear view through the door's peephole viewer;

d) A CPU and video processor configured to collect and store image and video activity data seen through the peephole viewer;

e) A communications module configured to transmit image, video, and activity data over a communication network to a local server or cloud server;

f) One or more external sensors connected via a sensor communication network such that at least one of the connected external sensors is a wireless proximity sensor module with one or more passive infrared sensors, configured to connect to the apparatus' CPU or microcontroller via the sensor communication network.

5. Apparatus for monitoring activity on the outdoors-facing side of a door through the door's integrated peephole viewer, mounted on the indoors-facing side of the door, comprising a main housing with:

a) A primary camera module with one or more lenses;

b) A secondary camera module with one or more lenses;

c) A mirror which may be rotated by an actuator, which redirects the door peephole viewer's optical path such that either the primary or secondary camera module is selected to have a clear view through the door's peephole viewer;

d) A CPU and video processor configured to collect and store image and video activity data seen through the peephole viewer;

e) A communications module configured to transmit image, video, and activity data over a communication network to a local server or cloud server;

f) One or more external sensors connected via a sensor communication network such that at least one of the connected external sensors is a wireless proximity sensor module with one or more active sensors, configured to connect to the apparatus' CPU or microcontroller via the sensor communication network.

6. Apparatus for monitoring activity on the outdoors-facing side of a door through the door's integrated peephole viewer, mounted on the indoors-facing side of the door, comprising a main housing with:

a) A primary camera module with one or more lenses;

b) A secondary camera module with one or more lenses;

c) A mirror which may be rotated by an actuator, which redirects the door peephole viewer's optical path such that either the primary or secondary camera module is selected to have a clear view through the door's peephole viewer;

d) A CPU and video processor configured to collect and store image and video activity data seen through the peephole viewer;

e) A communications module configured to transmit image, video, and activity data over a communication network to a local server or cloud server;

f) One or more external sensors connected via a sensor communication network such that at least one of the connected external sensors is a wireless proximity sensor module with a plurality of proximity sensors, mounted at angles varying from zero to 180 degrees to allow a wide virtual field of view, configured to connect to the apparatus' CPU or microcontroller via the sensor communication network.

\* \* \* \* \*